(12) United States Patent
Ulen et al.

(10) Patent No.: US 12,294,649 B2
(45) Date of Patent: May 6, 2025

(54) DECENTRALIZED HOME SENSOR NETWORK

(71) Applicant: Alarm.com Incorporated, Tysons, VA (US)

(72) Inventors: Colin Ulen, Cambridge, MA (US); Juan Abellanas Sanchez, Washington, DC (US); William Converse Blanchard, Arlington, VA (US); Christopher Clarke Jewett, Arlington, VA (US)

(73) Assignee: Alarm.com Incorporated, Tysons, VA (US)

( * ) Notice: Subject to any disclaimer, the term of this patent is extended or adjusted under 35 U.S.C. 154(b) by 152 days.

(21) Appl. No.: 17/879,019

(22) Filed: Aug. 2, 2022

(65) Prior Publication Data

US 2023/0044362 A1 Feb. 9, 2023

Related U.S. Application Data

(60) Provisional application No. 63/229,198, filed on Aug. 4, 2021.

(51) Int. Cl.
*H04L 9/40* (2022.01)
*H04L 9/08* (2006.01)
*H04L 9/14* (2006.01)
*H04L 9/32* (2006.01)

(52) U.S. Cl.
CPC .............. *H04L 9/32* (2013.01); *H04L 9/0819* (2013.01); *H04L 9/14* (2013.01)

(58) Field of Classification Search
CPC ............ H04L 9/32; H04L 9/0819; H04L 9/14
See application file for complete search history.

(56) References Cited

U.S. PATENT DOCUMENTS

| | | | |
|---|---|---|---|
| 7,395,336 B1 * | 7/2008 | Santharam | H04L 67/143 709/227 |
| 8,014,789 B2 | 9/2011 | Breed | |
| 8,350,694 B1 | 1/2013 | Trundle et al. | |
| 8,531,294 B2 | 9/2013 | Slavin et al. | |
| 8,862,092 B2 | 10/2014 | Reitnour | |

(Continued)

OTHER PUBLICATIONS

PCT International Search Report and Written Opinion in International Appln. No. PCT/US2022/074412, mailed on Oct. 12, 2022, 21 pages.

*Primary Examiner* — Ghodrat Jamshidi
(74) *Attorney, Agent, or Firm* — Fish & Richardson P.C.

(57) ABSTRACT

Methods, systems, and apparatus, including computer programs encoded on computer storage media, for managing sensor communications in a monitored environment. One of the methods includes receiving, by a server and from a device that is accepted to connect with a first network using acceptance data that includes a first key indicating the device is associated with the first network, a request a) to join a second network different from the first network b) that identifies the first key; determining, by the server and using the identification of the first key in the request, that the device that transmitted the request is associated with the first network; and providing, by the server, an notification i) to a user associated with the first network ii) indicating that the device has moved outside the first network.

19 Claims, 13 Drawing Sheets

Flow Diagram of Sensor Sending Data Uplink to Backend (Adhoc)

(56) References Cited

U.S. PATENT DOCUMENTS

| | | | |
|---|---|---|---|
| 8,914,869 B2* | 12/2014 | Shu | H04W 36/005 |
| | | | 726/6 |
| 8,918,631 B1 | 12/2014 | Kumar et al. | |
| 10,313,303 B2 | 6/2019 | Baum et al. | |
| 10,405,070 B2 | 9/2019 | Schwarzkopf et al. | |
| 10,652,735 B2 | 5/2020 | Li | |
| 11,341,590 B1 | 5/2022 | Prugh et al. | |
| 2002/0193125 A1* | 12/2002 | Smith | H04W 88/02 |
| | | | 455/458 |
| 2007/0256105 A1 | 11/2007 | Tabe | |
| 2009/0213811 A1 | 8/2009 | Wang et al. | |
| 2010/0159902 A1* | 6/2010 | Roundtree | H04M 1/72445 |
| | | | 455/414.1 |
| 2011/0010764 A1 | 1/2011 | Lei et al. | |
| 2012/0142341 A1 | 6/2012 | Nagpal et al. | |
| 2014/0199983 A1* | 7/2014 | Bergstrom | H04W 8/20 |
| | | | 455/418 |
| 2014/0295807 A1* | 10/2014 | Li | H04M 3/42195 |
| | | | 455/414.1 |
| 2015/0047009 A1* | 2/2015 | Sone | H04L 12/4641 |
| | | | 726/11 |
| 2015/0172968 A1 | 6/2015 | Lund et al. | |
| 2017/0228550 A1* | 8/2017 | Harb | H04N 21/4753 |
| 2017/0257226 A1 | 9/2017 | Bi | |
| 2017/0263094 A1 | 9/2017 | Slavin et al. | |
| 2018/0048465 A1 | 2/2018 | Schliwa-Bertling et al. | |
| 2018/0270210 A1 | 9/2018 | Gan et al. | |
| 2020/0082937 A1* | 3/2020 | Bodurka | H04W 4/80 |
| 2020/0252380 A1* | 8/2020 | Sathe | H04W 12/06 |
| 2020/0374350 A1* | 11/2020 | Zhu | H04W 76/18 |
| 2021/0044568 A1* | 2/2021 | Murata | H04L 63/0245 |
| 2021/0056786 A1* | 2/2021 | De La Garza | H04W 4/029 |
| 2021/0160183 A1 | 5/2021 | Mindler et al. | |
| 2021/0266857 A1* | 8/2021 | Draznin | H04W 4/80 |
| 2022/0261933 A1 | 8/2022 | Prugh et al. | |
| 2022/0303121 A1* | 9/2022 | Manevich | G06F 16/9024 |
| 2023/0171811 A1* | 6/2023 | Fan | H04W 76/27 |
| | | | 370/329 |

* cited by examiner

LoRaWAN PHYPayload Frame Structure

| | | | | | | | | | | | |
|---|---|---|---|---|---|---|---|---|---|---|---|
| | | | | | PHYPayload | | | | | | |
| | | | MACPayload or Join-Request or Rejoin-Request or Join-Accept | | | | | | | | MIC |
| | | | FHDR | | | | | | FPort | FRMPayload | |
| MHDR | | | DevAddr | FCtrl | | | | | | | |
| MType | RFU | Major | | ADR | DL: RFU / UL: ADRACKReq | ACK | DL: FPending / UL: ClassB | FOptsLen | FOpts | | |
| 1 Byte | | | 4 Bytes | 1 Byte | | | | | 2 Bytes | 0 to 15 Bytes | 0 to 1 Byte | 0 to K Bytes | 4 Byte |
| [7:5] | [4:2] | [1:0] | [31:25] | [24:0] | [7] | [6] | [5] | [4] | [3:0] | | | | |
| N/A | N/A | N/A | N/A | N/A | N/A | N/A | N/A | N/A | N/A | NwkSEncKey | N/A | Port 0: NwkSEncKey / Port 1 to 223: GuestSKey or HomeSKey | DL: SNwkSIntKey / UL: SNwkSIntKey and FNwkSIntKey |

FIG. 2B

HomeACK Uplink

301 ─▶

| MHDR | | DevAddr | FCtrl | | | | FCnt | MIC |
|---|---|---|---|---|---|---|---|---|
| MType | RFU | Major | | RFU | ACK | RFU | FOptsLen | | |
| 1 Byte | | | 4 Bytes | 1 Byte | | | | 2 Bytes | |
| 111 | 000 | 00 | [31:25] | [24:01] | 00 | [5] | 0 | 0000 | | |
| N/A | N/A | N/A | N/A | N/A | N/A | N/A | N/A | N/A | HomeSKey |

303 ⌒

MACPayload · FHDR · HomeAck

HomeACK Downlink

| MHDR | | DevAddr | FCtrl | | | | FCnt | MIC |
|---|---|---|---|---|---|---|---|---|
| MType | RFU | Major | | RFU | ACK | FPending | FOptsLen | | |
| 1 Byte | | | 4 Bytes | 1 Byte | | | | 2 Bytes | |
| 111 | 000 | 00 | [31:25] | [24:01] | 00 | [5] | [4] | 0000 | | |
| N/A | N/A | N/A | N/A | N/A | N/A | N/A | N/A | N/A | HomeSKey |

305 ⌒

MACPayload · FHDR · HomeAck

FIG. 3B

DECENTRALIZED HOME SENSOR NETWORK

CROSS-REFERENCE TO RELATED APPLICATION

This application claims the benefit of U.S. Provisional Application No. 63/229,198, filed on Aug. 4, 2021, the contents of which are incorporated by reference herein.

TECHNICAL FIELD

This specification relates generally to network monitoring technology and, for example, monitoring devices with varying network protocols in a home monitoring system.

BACKGROUND

A home network is a type of network that facilitates communication among devices within a close vicinity of a home. Devices capable of interacting over a home network can interact with one another and provide useful information to homeowners. The home network can be secure, such that individuals external to the home cannot access or view data personal to the homeowners and their devices.

SUMMARY

This specification generally relates to techniques for improving network management in a home environment. Generally, these techniques include monitoring multiple sensor devices at the home environment and ensuring secure communications between each of the sensor devices in a distributed or decentralized environment. These techniques utilize a multiple-physical protocol, referred to as Ramble, aimed at efficient utilization of low power wide area networks (LPWAN). In particular, the techniques described in this specification may enable the devices included in a monitored property and external to a monitored property to transmit and receive data from a cloud-computing infrastructure while reducing energy consumption, increasing data delivery reliability, and providing rich metadata on the home network and the attached sensor devices.

The techniques described here may enable the control panel to communicate with other control panels or other gateways in other homes. By enabling the gateways and control panels to communicate with one another at different properties, a person, which seeks to communicate with his/her home, can communicate with a neighbor's house control panel to send information to the home control panel without the neighbor's house control panel having access to information in this communication and when a direct connection to their control panel is unavailable.

The Ramble protocol enables the use of multiple physical layer protocols, which feed into the Ramble protocol. The Ramble protocol may be comprised of multiple subnets, each subnet corresponding to a different property, e.g., residential or commercial. Each underlying physical layer protocol can be modified except for the data payload. In some implementations, the Ramble protocol is about data delivery, reliability, and metadata of the network. Ramble protocol enables the use of multiple protocols, such as Bluetooth Low Energy (BLE), Long Range Wide Area Network (LoRaWAN), Wi-Fi, Cellular Cat-M1, and Cellular Cat-NB1, to name a few examples. Some of these protocols can correspond to backhaul physical layer protocols, e.g., Cellular Cat-M1 Cellular Cat-NB1, and Wi-Fi, and some of the protocols can correspond to local physical layer protocols, e.g., BLE and LoRaWAN.

In a home monitoring environment, when a device that communicates using the local physical layer protocol needs to exchange communication data with a backend system, the device can use the backhaul physical layer protocol to communicate with the back end system. In some implementations, the backhaul physical layer protocol can be located in the same physical device as the local physical layer protocol. In some implementations, the backhaul physical layer protocol can be located in another device entirely and exchanged between the two devices using a physical layer protocol. If the backhaul physical layer protocol runs on a non-Ramble existing protocol, then the backhaul physical layer protocol can encapsulate the Ramble packet, as will be described below.

In these cases, for a sensor device in a home network to be considered a Ramble device, only one Ramble supported physical layer protocol may be required. However, including two underlying protocols in a device, e.g., a backhaul physical layer protocol and a local physical layer protocol or some combination of the two, is recommended to ensure safe and secure communications in the case of certain events, e.g., failover and moving away from the home network. In some examples, stock LoRaWAN devices can operate on the Ramble network, assuming a LoRaWAN physical layer protocol is present in the device, and these devices can operate on a private Ramble network.

In some implementations, the home monitoring network provides features that improve upon the existing Ramble protocol network. These improved features include an ability for certain devices in a home monitored property to automatically change roles, e.g., change between an end device and a gateway, based on certain events. The improved features can offer modifications of existing protocols with a new cryptographic key that allows the gateway to decrypt messages using local rules engine support. An end device can correspond to a source or a destination device in a Ramble protocol network. A gateway device can correspond to a device that translates one communication protocol into another communication protocol.

In some examples, the LoRaWAN protocol is flexible and extensible to support the Ramble protocol without breaking the LoRaWAN protocol specification. LoRaWAN utilizes an end-to-end encryption scheme to ensure data is properly transmitted securely. In some examples, one feature involves the use for the devices to utilize multiple communications paths and "self-healing" methods to ensure data delivery using the one or more devices when the one or communication protocols are down, where the devices can dynamically switch between a gateway device and an end device. In some implementations, the improved features allow end devices to have enhanced features while at the home property and can maintain connectivity to the network at the home property when roaming beyond the home network.

The Ramble protocol can include features such as, for example, the Radio Frequency (RF) channel plan, a preamble length, a "home" key functionality, and ensuring non-approved public LoRaWAN devices avoid joining the Ramble protocol network. In some implementations, the Ramble protocol enables sensors and devices to use cost effective radios to act as an end device or a gateway, e.g., LoRa PHY radios. Then, such devices can switch roles between an end device and a gateway, depending on the circumstances.

Moreover, enabling a device to switch different roles can include the following: (i) a device will have an out of the box default role to assist with provisioning. Provisioning corresponds to the backend server's responsibility to set a device as being either an end device or a gateway device when the device initially connects to a home network. (ii) The backend server can configure a different role to a device when the device is provisioned, the different role can be a role different from the role assigned to the device when first taken "out of the box". (iii) The backend server can change the role of the device on the fly, or at a point in time, depending on a local condition or event, e.g., a power outage, a transfer between networks, etc. (iv) A device cannot be both an end device and a gateway device at the same time.

In some implementations, devices that operate the Ramble protocol can include small devices that are externally powered or battery powered. These devices can include, for example, indoor cameras, outdoor cameras, doorbells, garage doors, dog collars, smoke sensors, driveway gate controller, and other devices, to name a few examples. In some examples, the Ramble protocol can provide these devices with the functionality to communicate over other networks as "Guests" to their home network. For example, the Ramble protocol allows "Guest" LoRaWAN devices to pass encrypted data through a Guest network, which cannot be locally decrypted, and can be passed to the backend. These features will be further described below.

In general, one innovative aspect of the subject matter described in this specification can be embodied in methods that include the actions of receiving, by a server and from a device that is accepted to connect with a first network using acceptance data that includes a first key indicating the device is associated with the first network, a request a) to join a second network different from the first network b) that identifies the first key; determining, by the server and using the identification of the first key in the request, that the device that transmitted the request is associated with the first network; and providing, by the server, an notification i) to a user associated with the first network ii) indicating that the device has moved outside the first network.

Other embodiments of this aspect include corresponding computer systems, apparatus, computer program products, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The foregoing and other embodiments can each optionally include one or more of the following features, alone or in combination. In some implementations, the method can include receiving, by the server, a first request from the device to connect to the first network; in response to receiving the first request, generating, by the server, the acceptance data of the device to connect with the first network, the acceptance data (a) including the first key indicating the device is associated with the first network and (b) encrypted with a second key. The first key and second key can be different. The method can include transmitting, by the server and to the device, the acceptance data in the first network.

In some implementations, the method can include prior to receiving the first request from the device to connect to the first network, receiving, by the server, first data from the device seeking to register to the first network managed by the server; in response to receiving the data, generating, by the server, second data to register the device as a particular role in the first network; and transmitting, by the server, the second data to the device in the first network. Transmitting the second data to the device in the first network can include transmitting, by the server, the second data including a third key to the device, the second data instructing the device to encrypt subsequent communications from the device using the third key. The third key can be different from the second key and the first key. Receiving the first request from the device to connect to the first network can include receiving, by the server, the first request from the device, the first request encrypted with the third key, and the first request indicating to the server that the device intends to communicate with other devices on the first network.

In some implementations, generating the acceptance data of the device to connect with the first network includes: decrypting, by the server, the first request with the third key; extracting, by the server, contents from the decrypted first request; comparing, by the server, the extracted contents to a stored profile associated with the device to determine whether the device is registered with the first network; in response to determining the device is registered with the first network, generating, by the server, the acceptance data including the first key, wherein the acceptance data indicates to the device to encrypt subsequent communications with the first key; and encrypting, by the server, the acceptance data using a second key. Receiving the second request to join the second network from the device can include receiving, by the server, the second request from one or more other devices at the second network, the one or more other devices at the second network configured to: (i) receive the second request from the device seeking to connect to the second network and (ii) provide the second request to the server.

In some implementations, determining the device that transmitted the second request is associated with the first network based on the identification of the first key associated with the second request can include: determining, by the server, the second request is encrypted with the first key, the first key being associated with the first network; determining, by the server, that a gateway device that transmitted the second request is associated with the second network; decrypting, by the server, the second request with the first key; and extracting, by the server, contents from the second request. The extracted contents can include a request to join the second network. The method can include in response to (i) determining the second request is encrypted with the first key, (ii) determining that the gateway device that transmitted the second request is associated with the second network, and (iii) determining that the extracted contents include the request to join the second network, determining, by the server, that the device that transmitted the second request to the gateway device is associated with the second network; and in response, determining, by the server, that the device that transmitted the second request to the gateway device is located outside of the first network. The method can include generating, by the server, instructions to indicate to the device seeking to connect to the second network to revert to encrypt subsequent communications with the third key while located at the second network; storing, by the server, a notification in an account of the device that the device is encrypting the subsequent communications with the third key while located at the second network; and transmitting, by the server, the generated instructions to device at the second network.

In some implementations, providing the indication to the user associated with the first network indicating the device has moved outside the first network can include transmitting, by the server, a notification to a client device of the user indicating that (i) the device has moved outside the first network and (ii) is located at the second network. The method can include in response to determining the device that transmitted the second request is associated with the first network, receiving, by the server, a third request to join the first network from the device; determining, by the server, the device that transmitted the third request is associated with the first network based on an identification of a third key associated with the third request; in response to determining that the device that transmitted the third request is associated with the first network based on the identification of the third key and determining the device was previously connected with the second network, generating, by the server, instructions to indicate to the device seeking to reconnect with the first network to encrypt subsequent communications with the first key; storing, by the server, a notification in an account of the device that the device is encrypting the subsequent communications with the first key while located at the first network; and transmitting, by the server, the generated instructions to device at the first network. The method can include, in response to generating the instructions to indicate to the device seeking to reconnect with the first network to encrypt subsequent communications with the first key, determining, by the server, the device is currently located at the first network.

The subject matter described in this specification can be implemented in various embodiments and may result in one or more of the following advantages. In some implementations, the system described below can enable efficient utilization of devices in LPWAN. Specifically, these devices, which may be located at a property, can still communicate with the backend server in the event of a network failure, power outage, or a change in a router's Wi-Fi credentials, to name a few examples. Moreover, should the devices move between different networks, the devices can still communicate with the backend server over the different network while maintaining content privacy. Similarly, the techniques augment data reliability during communications by performing encryption key management that identifies to the backend server (i) a network that the corresponding device is associated and (ii) whether the device is located at a location different from a location associated with the device's corresponding network. As such, the system enables devices to communicate securely and efficiently in a monitored environment.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIG. 2B is a block diagram that illustrates an example of a frame structure in a LoRaWAN message.

FIG. 3B is a block diagram that illustrates an example frame structures for an uplink HomeACK and for a downlink HomeACK.

Like reference numbers and designations in the various drawings indicate like elements. The components shown here, their connections and relationships, and their functions, are meant to be examples only, and are not meant to limit the implementations described and/or claimed in this document.

DETAILED DESCRIPTION

Figure 1:
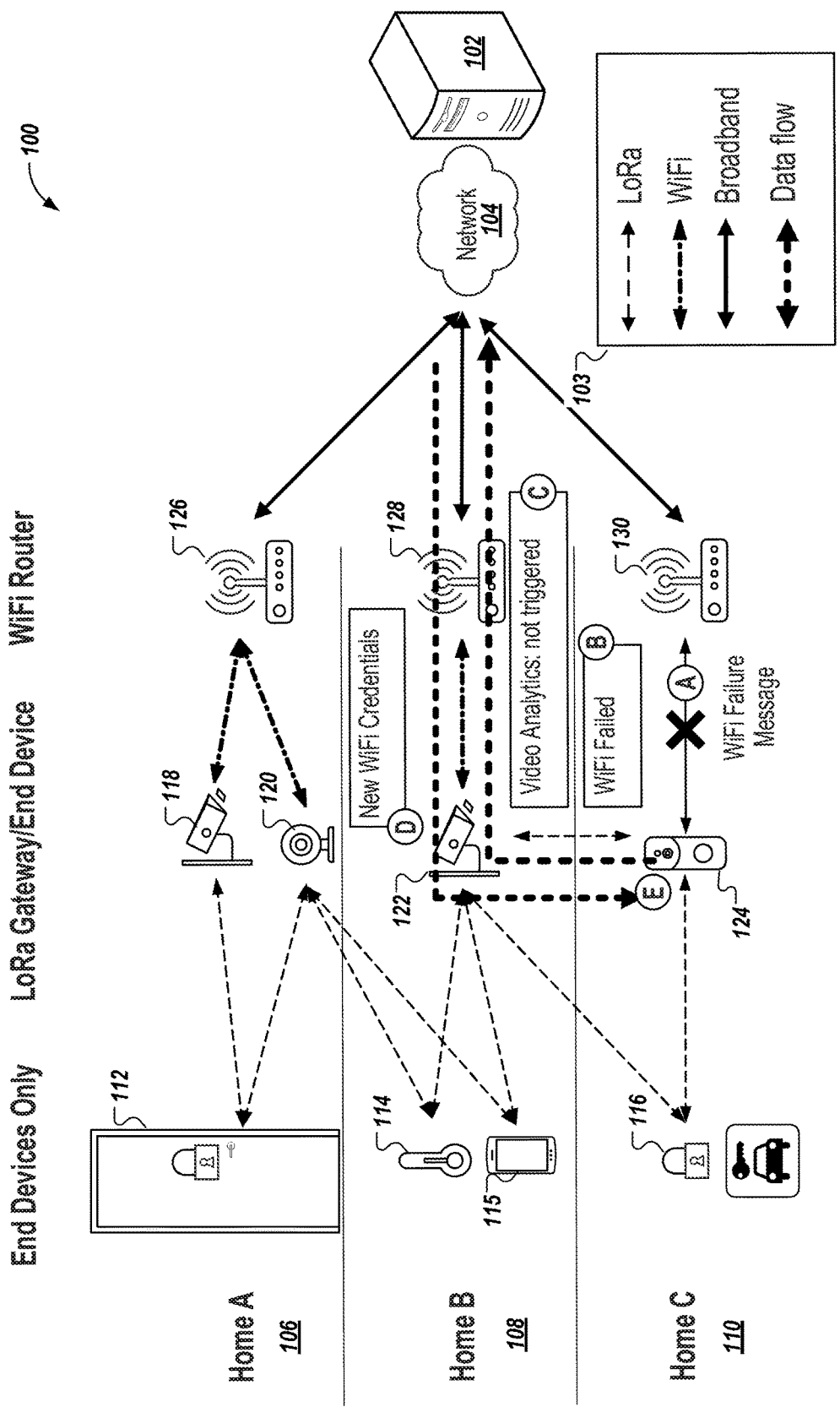
FIG. 1 is a block diagram that illustrates an example of a system for managing sensor communications in a home environment.

FIG. 1 is a block diagram that illustrates an example of a system 100 for managing sensor communications in a home environment. The system 100 can include one or monitored properties each with their own set of end devices, LoRa devices, and various Wi-Fi routers. For example, the system 100 illustrates a Home A 106, a Home B 108, and a Home C 110. These homes or properties can be houses, townhouses, apartments, or condominiums, to name a few examples. As illustrated in system 100, Home A 106 is neighbor to Home B 108, Home B 108 is neighbor to both Home A 106 and Home C 110, and Home C 110 is neighbor to Home B 108. FIG. 1 illustrates various operations in stages (A) through (D) which can be performed in the sequence indicated or in another sequence.

Each home can include a set of end devices, a set of Long Range (LoRa) Gateway/End Devices (hereinafter "LoRa device"), and Wi-Fi routers that communicate with one another over a network. For example, Home A 106 can include a front door lock 112 as an end device, a video camera 118 as a LoRa device and an indoor camera 120 as a LoRa device, and a router 126. Home A 106 may include other devices that can communicate over the Ramble network, e.g., a control unit server, one or more speakers, one or more lights, one or more other sensors, home devices, and an HVAC system. Home B 108 may include devices similar to and different from the devices associated with Home A 106. As illustrated in system 100, these devices can include a thermostat 114, a client device 115, an outdoor camera 122 as a LoRa device, and a router 126. Similar to Home A 106, Home B 108 can include other end devices and LoRa Gateway devices. Home C 110 may include devices similar to and different from the devices associated with Home A 106 and Home B 108. As illustrated in system 100, these devices can include a garage door lock 116, a doorbell camera 124, and a router 130.

The system 100 includes a legend 103 that illustrates communication mediums. The communication mediums include the LoRa protocol, a Wi-Fi protocol, a broadband protocol, and a flow of the data illustrated between stages (A) through (E). In this manner, the Ramble protocol can be efficiently utilized by managing each of the devices in system 100 at the different homes or monitored properties with different communication protocols. The Ramble protocol, as illustrated in system 100, enables end devices to communicate with any gateway that is in feasible range. Gateway devices can become end devices at a moment's notice, based on instruction from the server 102. In the event of a Wi-Fi failure or Wi-Fi message failure, the Wi-Fi router can find an alternate data path to communicate with the server 102.

A gateway, such as the video camera 118, the indoor video camera 120, the video camera 122, and the doorbell camera 124, can include one channel that is used for both transmission and reception capabilities. Typically, these gateways include eight channels, but one channel allows the gateways to switch between transmit and receive capabilities, but not both at the same time.

During stage (A), the doorbell camera 124 can communicate with a router 130 over a broadband network. However, during a particular communication, the doorbell camera 124 can determine that the communication over the broadband network failed. The failure can be based on a broken broadband connection, a Wi-Fi credential change, or an issue with the router to name a few examples. At this time, the doorbell camera 124 can determine that no communication is then able to get to the garage door lock 116 or any other sensor devices at home C 110.

During stage (B), the doorbell camera 124 can determine that an issue exists with the router 130. In this case, using a protocol from the Ramble protocol, the server 102 can communicate with the video camera 122 using a LoRa protocol. The doorbell camera 124 can transmit a message indicating that an issue exists with the router 130 and its communication with the server 102.

During stage (C), the doorbell camera 124 can transmit the message indicating the issue exists with the router 130 to the video camera 122. The video camera 122, which originally acted as an end device, can receive the message from the doorbell camera 124 and change its role from an end device to a gateway device based on the contents within the message. In some examples, the video camera 122 can check its operating status and determine that its video analytics are not triggered, e.g., no motion or video detection in its field of view. In response to determining that the video camera 122's video analytics is not triggered, the video camera 122 can switch to a gateway device and transmit the message received from the doorbell camera 124 to the router 128 at home B 108 over the Wi-Fi protocol. Then, the router 128 can transmit the message to the server 102 over network 104 to indicate of the issue with the router 130 or a protocol failure associated with the Wi-Fi.

During stage (D), the server 102 can receive the message that an issue exists with the router 130 and try to communicate with the router over a broadband network. If the server 102 determines that the router 130 has failed, the server 102 can determine if new Wi-Fi credentials exist for router 130. If the server 102 determines new Wi-Fi credentials exist for router 130, then the server 102 can transmit those Wi-Fi credentials, e.g., SSID and password, back to the router 128. The router 128 can forward the new Wi-Fi credentials to the video camera 122 over the Wi-Fi network. Subsequently, the video camera 122 can forward the Wi-Fi credentials to the server 102 located at the Home C 110 over the LoRa protocol network.

During stage (E), the doorbell camera 124 can receive the Wi-Fi credentials from the video camera 122 and request access to the router 130 using the received Wi-Fi credentials. For example, the doorbell camera 124 can provide the received Wi-Fi credentials to the router 130 and request broadband protocol access. If the router 130 accepts the Wi-Fi credentials, then the router 130 can provide broadband protocol access to the doorbell camera 124, and the doorbell camera 124 can deem that the issue has been fixed.

In some implementations, other issues may exist with one or more of the sensors illustrated in system 100. Each of the devices at the home can communicate with the LoRa gateway/end devices over a LoRa protocol. For example, the door 112 can communicate with the video camera 118 and the indoor video camera 120 over a LoRa protocol at home A 106. The thermostat 114 and the client device 115, found at Home B 108, can communicate with the indoor video camera 120 at Home A 106. Similarly, the thermostat 114 and the client device 115 can communicate with the video camera 122 over a LoRa network. Lastly, the garage door lock 116 can communicate with the video camera 122 at Home B 108 and the doorbell camera 124 at Home C 110 over the LoRa network. These end devices that can communicate with other LoRa gateway/end devices at different homes using the LoRa protocol can do so because the latter devices are in range of the former devices. As the LoRa protocol can operate over longer distances than Wi-Fi, for example, issues with devices or protocols of devices at one home can be fixed by routing communications to other LoRa Gateway/end devices at other homes to notify the server 102 of device issues.

In some implementations, these types of switches between communication protocols can be based on various events. These events can include failure of a backhaul physical layer protocol and failure of a local physical layer protocol, to name a few examples. In this case, the LoRa gateway/end device can act as a one-channel gateway, which can include firmware that enables these devices to act as either the LoRa gateway or the end device. In this case, the LoRa gateway/end device can switch between both modes of operation, e.g., end device or gateway, to optimize network performance, reliability, and serve as applicable needs to the devices in the home properties within proximity of one another.

In some implementations, some devices in the system 100 can be configured to act as a gateway device even when their primary role is configured as an end device. In this case, these devices can switch to the gateway mode and communicate to the server 102 over an alternative data path if the LoRa protocol path fails. These devices can switch modes between a gateway device and an end device based on multiple cases. For example, a gateway device may choose to behave as an end device before a primary backhaul protocol path, e.g., Wi-Fi, LTE, Cat-M, and Ethernet, are enabled at the home property. This may be the case to assist with provisioning of the primary protocol path by passing down protocol network credentials from the server 102 over network 104.

In some examples, a gateway device, such as video camera 122, may choose to act as an end device when a primary protocol path fails due to one or more events, e.g., power outages, credential changes, or any other failures. In this case, the video camera 122, now acting as the end device, can continue to communicate to the server 102 and other devices using other protocols in the Ramble protocol scheme over different gateways, e.g., indoor video camera 120 or video camera 118. This can include, for example, the end device notifying an application of the server 102 of a primary path failure as soon as a failure is detected. In response, the server 102 can provide updated network credentials associated with the primary path over network 104 to the video camera 122 through either indoor video camera 120 or video camera 118. Then, subsequent communications from other end devices or other gateways can be provided over a non-failed protocol path. Then, the video cameras 118 and 120 can act as a relay and continue to forward communication from other end devices, e.g., thermostat 114 and client device 115, and the now changed end device, e.g., video camera 122, to the server 102.

Figure 2A:
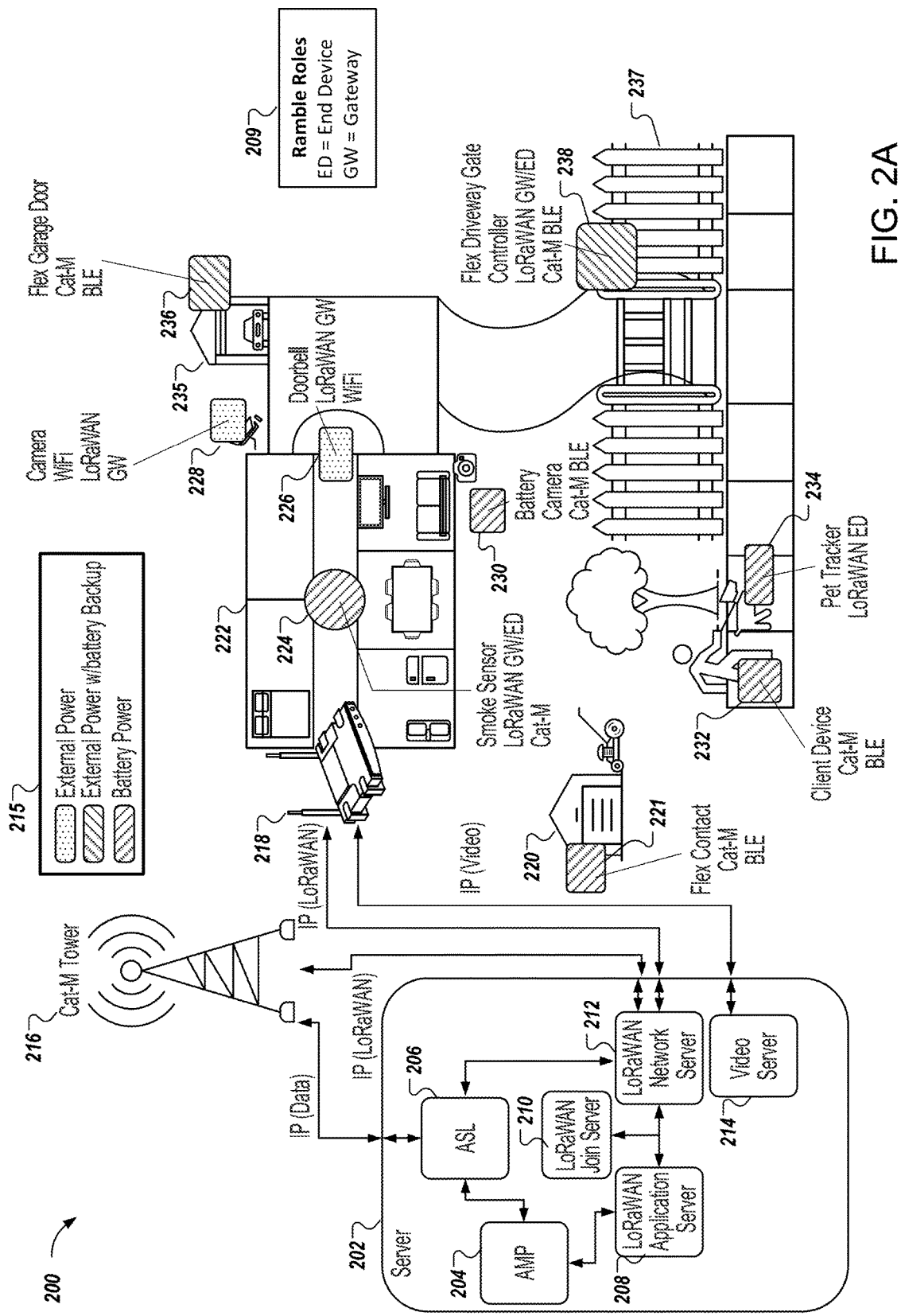
FIG. 2A is a block diagram that illustrates an example of a system for managing sensor communications in a home environment based on the Ramble protocol.

FIG. 2A is a block diagram that illustrates an example of a system 200 for managing sensor communications in a home environment based on the Ramble protocol. The system 200 illustrates various components within a home environment and how those components can communicate with a server 202. The components within the home environment can communicate with the server 202 over a cellular Cat-M tower 216 and a router 218. Legend 209 illustrates the roles for the sensors, e.g., end device (ED) or gateway (GW). The home environment illustrates various components, which will be described below.

In some implementations, the server 202 includes an AMP server 204, an ASL server 206, a LoRaWAN application server 208, a LoRaWAN join server 210, a LoRaWAN network server 212, and a video server 214. The ASL server 206 is configured to accept connections and queries over internet protocol (IP) and enables for access to data within the server 102. The AMP server 204 can include a server that enables access to various software stacks. For example, the AMP server 204, which can correspond to Apache, MySQL/MariaDB, and Perl/PHP/Python software stacks, enable the server 202 to run dynamic Web service or servers. In some examples, the AMP server 204 can store operating systems for the server 202, such as Linux, Windows, macOS, Darwin, Solaris, and FreeBSD, to name a few examples. The ASL server 206 can provide results to the connections to the external component that provided the request. For example, the ASL server 206 may be a JAVA component that communicates using MySQL to various databases in the server.

The LoRaWAN application server 208 is a server that can include virtual and physical components and seated between database servers, that stores application data, and web servers, that communicate with external clients. The LoRaWAN application server 208 can be configured to support application and development for delivery for different LoRaWAN applications. For example, the LoRaWAN application server 208 can request data from an application and provide data from an application to the ASL server 206 to communicate with external clients.

The LoRaWAN join server 210 can handle the data flow of communications using the LoRaWAN protocol, including network and application authentication and key generation for various devices and servers within the server 202. The LoRaWAN join server 210 can issue acceptances to devices seeking access to the Ramble network. In response, the LoRaWAN join server 210 can issue session keys and other keys, identifiable by a session identification (ID), to network servers, application servers, and devices in the home property, each key provided in encrypted form.

The LoRaWAN network server 212 is a server that can handle communications at the network layer, which include commands such as MAC commands. For example, the LoRaWAN network server 212 can store device configuration, e.g., MAC addresses, and network session keys. The LoRaWAN network server 212 can handle join-accept messages, uplink handling messages, join-request messages, and data uplink messages, to name a few examples.

The video server 214 can include a server that handles storing, receiving, and delivering video data to one or more devices. For example, video servers can be utilized in security, surveillance, and analytics applications and configured to captured video data, store the video data, and deliver the video data in real time or post capture to one or more other devices. The video server 214 can communicate over the LoRaWAN protocol to the router 218, e.g., receiving and transmitting communications.

In some implementations, the home environment of the system 200 can include a variety of components. For example, the home environment can include a home property 222, an external house 220, a garage 235, a sidewalk and a gate 237, and other components. The home environment can include one or more sensors. These sensors can include end devices, gateway devices, and devices that can modify a corresponding role and switch between an end device and a gateway device. For example, the home property 222 can include a smoke sensor 224, a router 218, a doorbell 226, a video camera 228, a battery camera 230, a client device 232 associated with a property owner, a pet tracker 234, a flex garage door 236, and a flex driveway gate controller 238. Each of these sensors may communicate over one or more communication protocols, for example, Cellular Cat-M, Wi-Fi, BLE, LoRaWAN, and others. Each of the sensors may be powered by one or more sources. For example, the sensors can be powered by external power, external power with battery backup, or battery power, as indicated in the legend 215.

As illustrated in system 200, each of the sensors in the home environment includes a specific role and communicate using a specific communication protocol. For example, the server 202 can instruct each of the sensors in the Ramble scheme that operate with Wi-Fi to act as gateway devices. For example, the smoke sensor 224 can act as a gateway or end device, is battery powered, and can communicate over cellular Cat-M, which can include the use of UDP, Ramble packets, cellular VPN, and device data. In some examples, the doorbell 226 can act as a gateway device, which is externally powered, and can communicate over Wi-Fi. In some examples, the flex driveway gate controller 238 can act as a gateway or end device, is powered externally and includes a battery backup, and can communicate over cellular Cat-M and BLE. The pet tracker 234 can act as an end device, is battery powered, and can communicate over LoRaWAN.

In some implementations, these devices can be divided into classes. The LoRaWAN devices can include battery-operated devices, with two classes. Class A devices can correspond to battery-powered devices that are asleep a majority of the time except when transmitting data. When class A devices transmit data, these devices will stay awake for a short period of time to receive any data, such as during the transmission and after the transmission. Another class can correspond to class B devices. Class B devices are asleep most of the time but wake up on a periodic basis to listen for data to receive. Class B devices can transmit data when available. In some examples, class B devices make use of receive windows, which are scheduled and dependent upon a beacon from a gateway to synchronize timing. The LoRaWAN devices can include non-battery powered devices that are externally powered. These devices can be classified as class C devices that are always listening except when transmitting data. Functionally, these classes indicate that Ramble end devices correspond to class A and a Ramble gateway device corresponds to a class C device, unless a gateway device is battery powered and using CAD. In some implementations, the LoRaWAN protocol enables end devices to communicate with another. These end devices can communicate when at least one of the devices includes a cellular communication backhaul and the end devices include BLE.

In some implementations, the home environment may include one or more sensors that are not included in the Ramble protocol scheme. For example, the flex garage door 236, can communicate over cellular Cat-M and BLE, is powered with external power and battery backup, and is not yet provisioned as an end device or a gateway. In some examples, the battery camera 230 can communicate over cellular Cat-M and BLE, powered with battery power, and is not yet provisioned as an end device or a gateway. The flex contact 221 can communicate over cellular Cat-M and BLE, is powered with battery power, and is not yet provisioned as an end device or a gateway. Lastly, the client device 232 can communicate over cellular Cat-M and BLE, can be powered with battery power, and is not yet provisioned as an end device or a gateway device.

Each these devices can communicate through a set of frequency channels and data rates. In some implementations, the Ramble protocol enables the same radio to be used for both the gateway device and the end device. In some instances, these radios can be configured as either a receiver or a transmitter at any one discrete moment in time. The reason the radio can act as either a transmitter or a receiver is that a single communication channel is used for communicating between the sensors of the home network environment.

In some implementations, the communication channel utilizes a single channel and a spreading factor. In some examples, a frequency associated with the single channel and the spreading factor associated with the single channel are chosen so that they do not intersect or interact with public LoRaWAN frequencies and spreading factor. This is to ensure minimal interference and false wakeups of end devices and gateways.

In some implementations, devices that act as gateways can be always powered on include certain characteristics. For example, the receiver of these devices acting as gateways are always on, except when in transmission mode. In some examples, if the device acting as the gateway uses a default channel mapping, then the receiver and the transmitter of the gateway can map to the same communication characteristics of connected end devices. In one example, these communication characteristics can correspond to a receiver frequency at 912.6 Megahertz (MHz) and a transmission frequency of 927.5 MHz. Other frequencies are possible.

In some examples, if the gateway moves to a non-default channel mapping, then the receiver of the device can duty cycle between a new frequency, spreading factor, and bandwidth and the default channel mapping over a period of time. The duty cycle does not need to be symmetric, but can be configured to allow for maximum amount of time spent on a non-default channel. Alternatively, time spent by the receiver or transmitter on a default channel can allow for minimum amount of time spent to detect preamble of communication messages. Lastly, when a gateway device includes a first receive window and a second receive window, only the uplink and the first receive windows can be changed to non-default values. The second receive window can remain on default values to ensure a fallback incase a channel mapping fails.

In some implementations, devices that act as gateways can be powered on by batteries and can include certain characteristics. For example, in these devices, the corresponding radio, e.g., both transmitter and receiver, is always off unless transmitting or performing channel activity detection (CAD). If these devices use a default channel map, then the receiver and transmitter maps frequency characteristics to the same frequency characteristics associated with end devices. If these devices move to a non-default mapping, then the receiver of these devices duty cycles between a new frequency, spreading factor, and bandwidth and the characteristics associated with the default channel mapping. The duty cycle for both non-default and default channels can be CAD periodicity, but CAD periodicity divided by two will offset only one channel. Said another way, the radio can perform CAD to sample energy on the channels to determine if activity exists. Because the radio can only listen to one channel/spreading factor at a time, the length of time required to listen to one channel may be no greater than half of the length of the expected incoming packet preamble. Otherwise, the radio may miss a packet on the other channel. In these devices, only the uplink and first receiver channels of these devices can be changed to default values. The second receiver can remain on default values to ensure a fallback incase a channel mapping fails.

In some implementations, devices that are set to end devices can communicate in an uplink manner and a downlink manner. If a device's role is set to an end device, then the end device can communicate in the uplink with the following characteristics. The spreading factor can correspond to eight, the channel bandwidth can include 500 KHz, a coding rate of 4/5, and each of these parameters can modified via MAC commands from the LoRaWAN network server 212. The network level data transmitted by these end devices can include a preamble, which can be a first length or a second length. These devices typically use the first length of the preamble. However, when the end device is communicating with a battery-powered gateway, the devices can use the second length of the preamble to turn on the battery-powered gateway. The second length can be longer than the first length.

The end device can communicate in a downlink manner over two receiver windows. For example, the first window can include communication characteristics such as, a spreading factor of 8, a channel bandwidth of 500 KHz, a frequency of 927.5 KHz, a coding rate of 4/5, and each of these parameters can modified via MAC commands from the LoRaWAN network server 212. In some examples, the second window, which is opened if the first window is not open, can include communication characteristics such as, a spreading factor of 8, a channel bandwidth of 500 KHz, a coding rate of 4/5, a frequency of 927.5 KHz, and each of these parameters cannot be modified via MAC commands from the LoRaWAN network server 212.

In some implementations, the type of channel plan used by these devices can be changed with MAC commands. These changes can be performed to suit local RF environments and prevent co-existing interference issues with different communication mediums. For example, one MAC command can include a creation or modification of a channel, e.g., NewChannelReq, NewChannelAns, DlChannelReq, and DlChannelAns. The Ramble devices can implement these creations and modifications of channel commands. These MAC commands allows the LoRaWAN network server 212 to change the default channel map to another new channel map, which is useful to avoid communication interference issues. This can be used to change the channel properties of the first receiver different from the channel properties of the second receiver. In this case that the channel properties of the first receiver and the second receiver are different, then a gateway would need to still periodically search for preambles from end devices on the default channel in case new devices seek to join the Ramble network, e.g., either new devices or guest devices that are roaming.

Other MAC commands can include (i) proprietary commands, (ii) Next Checkin Time commands, (iii) Configure ACK Behavior, (iv) Ramble version info, and (v) Stats Since Last Checkin. (i) The proprietary commands can include commands appropriate for Ramble behavior. These commands can include AdCNextCheckinTimeReq, which corresponds to an end device next guaranteed check in time (in milliseconds); AdcConfigureACKBehavior, which corresponds to end device ACK behavior; AdcRambleMinorVersion, which indicates which Ramble version is supported; and, AdcStatsSinceLastCheckin, which indicates transmit various stats since the last scheduled checkin time.

The AdCNextCheckinTimeReq corresponds to when the end device can indicate when it knows the next time it will transmit. Most end devices can send data at random intervals, but also, Ramble devices can include a periodic scheduled packet. The AdcConfigureACKBehavior corresponds to when an end device can be configured to only send 'confirmed' message types or mostly send 'unconfirmed' message types. Scheduled packets are confirmed and can be used by the HomeAck messages. The AdcRambleMinorVersion command is sent as part of an initialization command to indicate the minimum version of the Ramble protocol that the device supports. The AdcStatsSinceLastCheckin command is sent with each scheduled checkin packet, and can be sent at other times. Sending of the AdcStatsSinceLastCheckin does not reset the statistics, but only when a scheduled packet is acknowledged are the statistics reset.

In some implementations, the devices within system 200 communicate with one another and to the server 202 using various encryption keys. The encryption keys can include an AppKey, an NwkKey, and a HomeKey, each of which correspond to root keys. The NwkKey can encrypt communications between an end device and the LoRaWAN network server 212. Any intermediate hop, e.g., router, end device, or gateway, will not be able to decrypt data encrypted with the NwkKey, including the LoRaWAN application server 208. The GuestKey or AppKey can encrypt communications between an end device and the LoRaWAN application server 208. Any intermediate hop, e.g., router, end device, or gateway, will not be able to decrypt data encrypted with the AppKey, including the LoRaWAN network server 212. The HomeKey, when provisioned, can be used by an end device instead of the GuestKey.

In some implementations, if the server 202 provisions an end device with a HomeKey, then the server 202 will ensure each of the gateways that communicate with that end device is provisioned with the same HomeKey. This ensures any gateway that communicates with that end device to decrypt any application traffic from an end device encrypting the application traffic for a HomeKey. This is useful for knowing the data type and a destination for transmitting the application traffic.

The implications of these keys indicates that two classes of end devices exists. The first class can correspond to home devices and the second class can correspond to guest devices. Home devices can be granted special features and enhanced more tightly with the larger Ramble protocol scheme. As such, home devices can execute local rules engine behavior and other intelligent and operate independently of the server 202 in the event of communication issues. On the other hand, guest devices can still include access to the Ramble protocol network while away from home, but the traffic from these guest devices would be prevented from being seen by gateways at properties local to the guest device's location. In fact, these gateways, which are local to the guest device's location and external to the guest device's actual home, would act as a simple pass through of communication.

In some implementations, the LoRaWAN application server 208 can only provide the HomeKey once a device has successfully joined the Ramble protocol network. As such, the HomeKey is not provided at a manufacturing time of the device, e.g., an end device or a gateway device. The end device can be issued a GuestKey at a time when the end device is manufactured. The GuestKey or AppKey associates a device to a guest. The end device can be provisioned with a HomeKey when the end device performs a join-accept. A join-accept corresponds to a message generated by the LoRaWAN Application server 208 to provide to an end device that has connected to the Ramble network. The LoRaWAN Application server 208 can encrypt the join-accept message with the AppKey. When the HomeKey is provisioned to the end device after a join-accept is performed, as mentioned, the gateways that correspond to these devices must be provisioned with the same HomeKey. This includes any device that is currently an end-device but is also a gateway device.

Typically, when a Ramble device is booted and not associated with an account on the backend server, the device will take notice of which communication protocols it has available. These communication protocols can include LoRaWAN, cellular, BLE, and Wi-Fi, to name a few example. The communication protocols correspond to communication protocols used to reach the backend server and begin initialization to connect to the Ramble network. For example, the cellular protocol can correspond to Cat 1, Ml, and NB1 protocols. When a device includes cellular, a newly booted device can wait for SIM card activation and establish a connection with the backend server. When a connection to the backend is successful, the backend server can provision the device with the appropriate commands and can include settings for other protocols and application settings. For Wi-Fi, the device assumes the local Wi-Fi credentials are unknown. In the priority of useful protocols, if a device has other protocols enabled along with Wi-Fi, then the device would prioritize the other protocols for communicating over the Wi-Fi protocol. Then, these devices can communicate with the backend server to make the backend server aware of its presence.

The newly booted devices can use messages to communicate with the backend using a variety of messages. The messages include ROLE_CAPABLE, ROLE_ACTIVE, ROLE_DEFAULT, WIFI_CREDENTIALS, and LOCATION, to name a few examples. The ROLE_CAPABLE message can indicate which role the device is capable of, either gateway, an end device, or both. The ROLE_ACTIVE message can indicate an active role of the newly booted device. In the ROLE_ACTIVE message, the device can indicate whether the device is currently an end device or a gateway. However, if a temporary bit is set in the ROLE_ACTIVE message, then the device is only in this role for a small amount of time and for a specific purpose, such as exchanging initialization information with the backend server. In the ROLE_DEFAULT message, the device can indicate the default role of the device. The ROLE_DEFAULT is identical to the ROLE_ACTIVE, unless a temporary bit is set. In the WIFI_CREDENTIALS message, the device can request for an SSID, login credentials, password, and encryption type to login to the Wi-Fi at the property. In the LOCATION message, the device can indicate its current location as a gateway or end device using, WifiLocate or GNSS, to name a few examples.

In some implementations, devices can be pre-provisioned with a DevEUI, a JoinEUI, an AppKey or GuestKey, and an NwkKey. A DevEUI can correspond to a globally unique MAC address that identifies the end device. The DevEUI can be similar to an IMEI or security modules. A JoinEUI can be stored on the device, and globally unique to the LoRaWAN Join server. A JoinEUI can indicate to the devices whether a device is a Ramble capable device. Guest devices or non-Ramble devices can use a different JoinEUI. If the device corresponds to a gateway device, then the gateway will set a temporary bit and set ROLE_ACTIVE to end device. The gateway device will use a default channel plan to begin sending out Join-Request messages. In this case, the device will alternate between PREAMPLE_LEN_OK and PREAMBLE_LEN_CAD. In uplink messages, the preamble is usually PREAMBLE_LEN_OK, and can be modified to help preserve battery life for battery-powered gateways.

PREAMBLE_LEN_CAD from end devices can be used in conjunction with channel activity detection on gateways that need to conserve power. For example, end devices change from using the PREAMBLE_LEN_OK to the PREAMBLE_LEN_CAD, when the backend server indicates that a battery powered gateway is the primary communication path. The PREAMBLE_LEN_CAD is shorter than the PREAMBLE_LEN_OK, and as such, the battery-powered gateway can use less power to only listen for packets with the PREAMBLE_LEN_CAD, while still listening to traffic. The gateway device continues this until connected to the backend server through either a Join-Accept or another protocol.

The device must use a Ramble JoinEUI so the LoRaWAN network server can provision the device appropriately. The device can indicate to the LoRaWAN network server which role or roles it is capable of, e.g., end device, a gateway, or both, and what the current default or active role is, e.g., end device or gateway. When a device successfully connects to the backend, the device can be provisioned with the appropriate parameters for that account and device. Initialization settings for that device can include settings for protocols and other application settings. In some implementations, the initial provisioning of the device can be performed over LoRaWAN and then the device can switch to using another protocol to complete initialization. For example, once initialization is complete, if the LoRaWAN device role is temporary, the role can revert to the default role and notify the backend server. At this point, the backend server may elect to provision or provide a HomeKey to the device. If the backend server makes this determination, then the backend server can ensure any gateways on the same account have the same HomeKey in their memory. If the device is provisioned with a HomeKey, the device will still keep the GuestKey provided during the pre-provisioning process. In some examples, while the backend server can provision an end device with the HomeKey, the backend should not use the same connection to provision the gateways on the same account with the HomeKey. This is due to security purposes and because the end device may be connecting to the backend server through a guest gateway, such as a neighbor.

In some implementations, a join-accept message contains various parameters used by the end device to configure itself to the Ramble network. The join-accept message can allow any pre-approved non-Ramble device to operate and communicate on the Ramble network. The parameters of the join-accept message can include, for example, a maximum MAC Payload size, a channel width, a power spectral density, a conducted output power of an end-device, a preamble sync word, a preamble length ok word, a preamble length CAD word, Ramble roam adjust delay, and a Ramble roam search delay. The channel width can include the minimum channel width for single channel transmissions. The power spectral density can correspond to the maximum measurement for the end device. The conducted output power of an end-device can correspond to the maximum measurement for the end device. The Ramble roam adjust delay can correspond to how long a gateway waits before sending a new channel plan data mapping to a guest device. The Ramble roam search delay corresponds to how long a gateway waits before trying a default channel plan when a gateway is lost.

In some implementations, the LoRaWAN protocol utilizes the concepts of ports. A port field can be indicated in the Ramble messages. For example, an FPort 0 corresponds to MAC commands. Any message found on FPort 0 corresponds to networking data or MAC commands. FPorts 1 to 223 correspond to the message must be made available to the LoRaWAN application server 208, e.g., messages for application ports and encrypted either with the GuestKey or the HomeKey. The MAC commands can be found in the header of a Ramble message, e.g., via an FOpts, or in the FRMPayload, but with FPort set to zero. A Ramble message cannot include both MAC commands in the header and in the payload of the Ramble message, so if the MAC commands are in the header and an FPort is present, then the FPort value must be a non-zero value. For example, FPort 0 indicates the FRMPayload is encrypted with theNwkSEncKey and the FPort 0 is encrypted with the NwkKey. FPorts 1 to 223 means the FRMPayload is encrypted with the AppSkey or HomeSKey. The FOpts can be encrypted with a NwkSEncKey, and MAC commands come from the LoRaWAN network server 212.

The AppKey and the NwkKey, as mentioned above, are root keys from which other session keys are derived. For example, the NwkKey is used to derive the FNwkSintKey, the SNwkSintKey, and NwkSEncKey sessions keys. The AppKey or GuestKey is used to derive an AppSkey session key. In some implementations, if the LoRaWAN application server 208 devices to provision a HomeKey to an end device or gateway device, the LoRaWAN application server 208 can provision a HomeKey to the device over FPort 1 utilizing the GuestSKey. In response, once a device has been provisioned with a HomeKey, then the device can use the HomeKey (and HomeSKey) in place of the GuestKey (and GuestSKey). A successful provisioning of a HomeKey can generate an immediate encrypted message, e.g., payload data or acknowledgement, back to the LoRaWAN application server 208.

If a device with provisioned HomeKey either receives a Rejoin request or sends a join request to the server 102, for any reason, then the HomeKey associated with the device can be cleared and revert back to the GuestKey before the (Re) Join Request is sent. One reason can include an ability for a Ramble end device to roam on public LoRaWAN networks. Moreover, clearing of the HomeKey and reverting back to the GuestKey implies that the end device and the LoRaWAN network server 212 maintain the GuestKey for that device, regardless of whether a HomeKey is provisioned to that device. If the LoRaWAN network server 212 detects a GuestKey being used where a HomeKey should be used, the LoRaWAN network server 212 can allow communications from that device and revert to the GuestKey for that device for subsequent communications. Generally, in this case, the LoRaWAN network server 212 can issue and trigger a security alert indicating that a particular device is outside the home network and communicating over another network. In some implementations, the generation of a GuestKey and an NwkKey can be generated at either manufacturing time of the device or derived from the JoinEUI, e.g., NwkKey, and the DevEUI, e.g., the GuestKey. Non-native Ramble devices can be allowed to join the Ramble network but with different GuestKeys and NwkKey, as a layer of risk mitigation.

In some implementations, after a device is activated and provisioned with a HomeKey, additional information is then stored on the end device. For example, the additional information can include a device address, a triplet of network session keys, e.g., NwkSEncKey, SNwkSintKey, and FNwkSintKey, and an application session key, e.g., AppSkey. These session keys are derived and provided by the LoRaWAN Join Server 210, which is ultimately tracked by the end device. Generally, if a HomeKey is provisioned, then the LoRaWAN join server 210 can generate the HomeSKey, to provide to the end device.

FIG. 2B is a block diagram that illustrates an example of a frame structure 201 in a LoRaWAN message. The frame structure 201 illustrates the payload structure of a LoRaWAN packet, in which some parts are encrypted with keys. For example, as illustrate in the frame structure 201, port 0 of the FRMPayload is encrypted with the NwkSEncKey and ports 1 to 223 of the FRMPayload are encrypted with either the GuestSKey or the HomeSKey. The download (DL) of the MIC is encrypted with the SNwkSintKey and the uplink (UL) of the MIC is encrypted with the SNwkSintKey and the FNwkSintKey keys.

In some implementations, the MIC or the message integrity code is a calculated encrypted value that is used to identify a single message. The MIC can be calculated using an 128 AES CMAC encryption algorithm, for example, for both a downlink frame and an uplink frame. The MIC can be added to the end of the frame structure 201.

In some implementations, the frame pending bit or FPending in FCtrl indicates that more packets waiting to be sent the LoRaWAN network server. For example, the FPending bit is included in the downlink LoRaWAN payload structure only.

The FCnt corresponds to frame counters. The frame structure 201 can include three frame counters. These frame counters include: (i) FCntUp for uplink frame counter on all ports, (ii) NFCntDown for network server frame counter on downlink using FPort 0, and (iii) AFCntDown for application server frame counter on downlink using FPort greater than 0. If guest devices communicate on the Ramble protocol scheme, if roaming is allowed, then the NFCntDown and AFCnt Down are combined into a single downlink frame counter known as FCntDown.

Figure 2C:
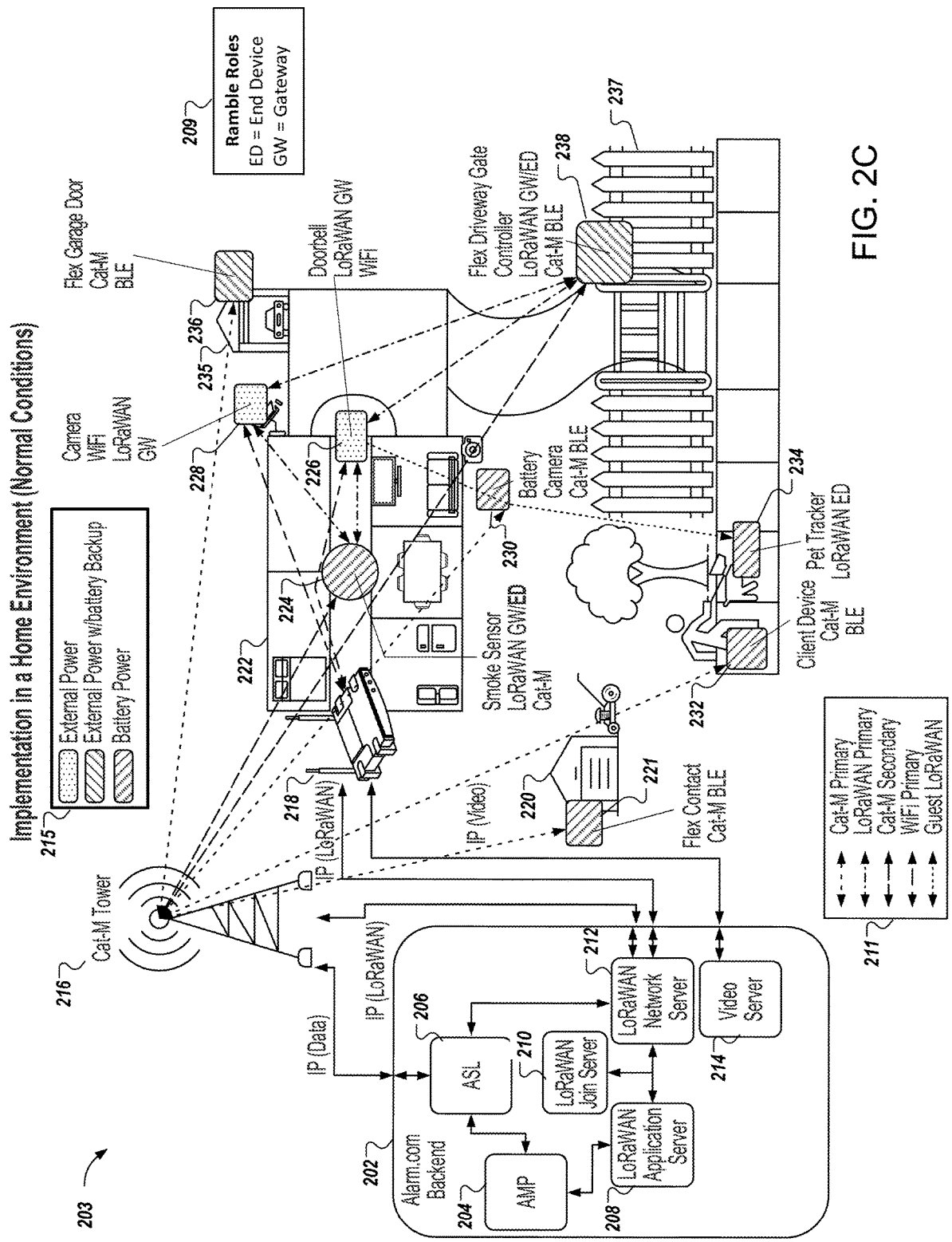
FIG. 2C is a block diagram that illustrates an example of a system for managing sensor communications in a home environment and the corresponding communication protocols based on the Ramble protocol.

FIG. 2C is a block diagram that illustrates an example of a system 203 for managing sensor communications in a home environment and the corresponding communication protocols based on the Ramble protocol. System 203 includes similar components and similar functionality to system 200. The similar components will not be described again here. System 203 illustrates how the sensors and devices of the home environment communicate with one another and the server 202 during normal operations.

For example, the flex contact 221 can transmit and receive messages to and from the server 202 over the cellular Cat-M tower 216 using a primary cellular Cat-M protocol. The client device 232 can communicate over cellular Cat-M over the cellular Cat-M tower 216 to the server 202. The pet tracker 234, which acts as an end device, can communicate using the Guest LoRaWAN protocol to the doorbell 226, which acts as a gateway. Similarly, the flex driveway gate controller 238, which can act as either a gateway or an end device, can communicate with the server 202 over the cellular Cat-M tower 216 using the secondary cellular Cat-M protocol. In some examples, the flex driveway gate controller 238 can communicate with the doorbell 226 and the video camera 228 using the primary LoRaWAN communication protocol.

In system 203, the battery camera 230 can communicate with the cellular Cat-M tower 216 using the cellular Cat-M primary protocol. The smoke sensor 224 can communicate with the cellular Cat-M tower 216 using the cellular Cat-M secondary protocol. In addition, the smoke sensor 224 can communicate with the video camera 228 and the doorbell 226 using a LoRaWAN primary protocol. The flex garage door 236 can communicate with the server 102 over the cellular Cat-M tower 216 using the cellular Cat-M primary protocol.

The video camera 228 can communicate with the flex driveway gate controller 238 and the smoke sensor 224 using the LoRaWAN primary communication protocol. In some examples, the video camera 228 can communicate with the router 218 using a Wi-Fi primary protocol.

The doorbell 226 can communicate with both the flex driveway gate controller 238 and the smoke sensor 224 using the LoRaWAN primary communication protocol. In some examples, the doorbell 226 can communicate with the router 218 using a Wi-Fi primary protocol.

The router 218 can communicate with both the LoRaWAN network server 212 and the video server 214 over broadband, sending IP or IP video data. In some examples, the router 218 can communicate with the video camera 228 and the doorbell 226 using a Wi-Fi primary protocol. The cellular Cat-M tower 216 can communicate with the ASL server 206 and the LoRaWAN network server 212 over IP and LoRaWAN over IP.

Figure 2D:
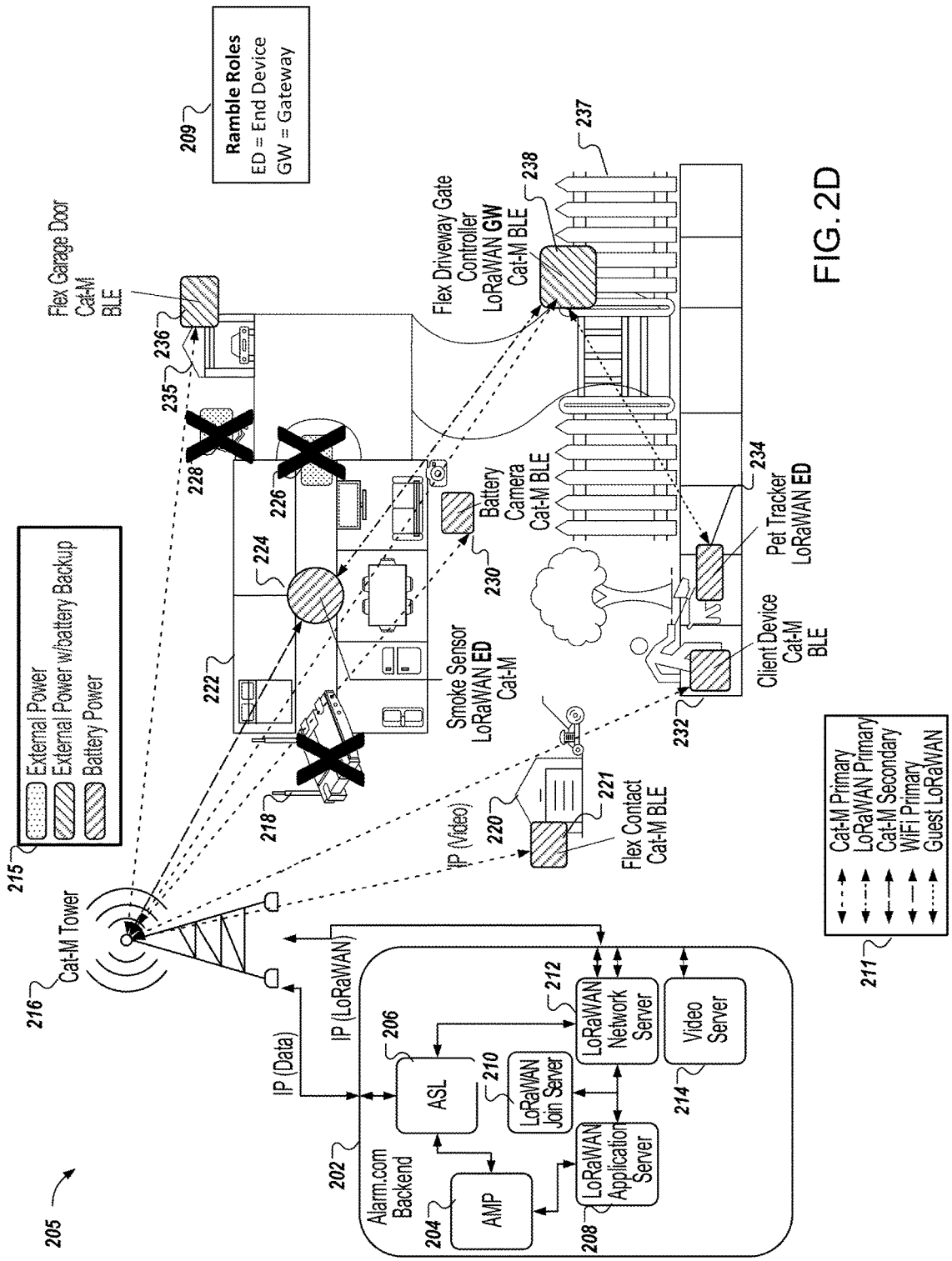
FIG. 2D is a block diagram that illustrates an example of a system for managing sensor communications in a home environment during a failure event based on the Ramble protocol.

FIG. 2D is a block diagram that illustrates an example of a system 205 for managing sensor communications in a home environment during a failure event based on the Ramble protocol. System 205 includes similar components and similar functionality to systems 200 and 203. The similar components will not be described again here. System 205 illustrates how the sensors and devices of the home environment communicate with the server 202 in the case of an event, such as a power outage.

The failure event of system 203 can correspond to a power outage. When a power outage occurs at the home environment, the devices, e.g., gateway devices, end devices, and non-Ramble devices, can act appropriately to ensure communications are maintained with server 202. For example, the devices, e.g., gateway, end-device, or non-Ramble device, which include the means to communicate using a cellular Cat-M backhaul protocol continue to operate as normal and communicate with server 202 over the cellular Cat-M tower 216. Devices with cellular Cat-M backhaul communications may not use Wi-Fi or broadband, and thus can continue communicating without interruption. For example, the flex contact 221, the client device 232, the battery camera 230, and the flex garage door 236 can continue to communicate with the cellular Cat-M tower 216 using a cellular Cat-M protocol.

However, any externally powered device without battery backup is turned off due to the power outage. For example, the devices externally powered can include the router 218, doorbell 226, and the video camera 228. As illustrated in system 205, the router 218, the doorbell 226, and the video camera 228 are illustrated with the symbol "X" over the component to indicate that these devices are no longer turned on due to the power outage. Consequently, these powered off devices cannot communicate with any other devices in system 205.

However, Ramble end devices continue to communicate with any Ramble gateway (GW) still powered on or roam to find another nearby Ramble gateway. Ramble devices that include battery backup and which include the option to switch to a gateway device can be instructed by the server 202 to switch to a gateway device. For example, since the Ramble gateways, which communicate over Wi-Fi, are powered off, e.g., the router 218, the doorbell 226, and the video camera 228, then the flex driveway gate controller 238 can switch roles to a gateway from an end device shown in system 203 to enable other nearby end devices to continue to communicate with the server 102 since these other end devices are not equipped with cellular backhaul protocols. For example, the pet tracker 234 can now communicate with the flex driveway gate controller 238 using the Guest LoRaWAN protocol. Subsequently, the flex driveway gate controller 238 can provide communications from the pet tracker 234 to the server 202 over the cellular Cat-M tower 216 using a cellular Cat-M primary protocol.

In some implementations, the Ramble devices can switch roles in various contextual scenarios. For example, a Wi-Fi Ramble device on initial boot can start as an end device and search for a Ramble network to join in order to be provisioned with Wi-Fi credentials at that Ramble network. When the end device connects to the Wi-Fi successfully, the server 202 can switch the end device to a gateway. In some examples, a cellular Cat-M Ramble battery-powered device on initial boot can start as an end device and search for a Ramble network to join in order to be provisioned with Wi-Fi credentials at that Ramble network. The cellular Cat-M Ramble battery can connect to the Ramble network and receive updated firmware from the server 202. The firmware can indicate for a gateway to operate on a single channel, include an ability to manage two channels. However, the server 202 maintains the role of the cellular Cat-M Ramble battery powered device as an end device and instructs the cellular Cat-M Ramble battery powered device to turn off the cellular Cat-M protocol to conserve battery power. In some examples, a cellular Cat-M Ramble battery powered device is already provisioned. However, power is lost at the home property of the Ramble network, as other devices informed the cellular Cat-M Ramble powered device of the power lost. The cellular Cat-M Ramble powered device connects to the server 202 using the cellular Cat-M protocol and is instructed to switch from an end device to a gateway.

In some examples, a Cat-M Ramble device has trouble with cellular registration. On the Cat-M Ramble device's initial boot, the device acts as an end-device and the device searches for a Ramble network to join. Once connected to the server 202, the server 202 can assist the troubled device with troubleshooting cellular registration remotely. In some examples, a Cat-M Ramble externally powered battery backup device is already provisioned and configured as a gateway. In this example, the home property experiences a power outage and the server 202 determines another device is a better gateway than the Cat-M Ramble externally powered battery backup device, so the server 202 instructs this Cat-M Ramble device to switch to an end device. In some cases, the server 202 can alternate or rotate which devices act as a gateway in an area to better spread out battery usage and maintain longer connectivity with battery-powered devices.

The flex driveway gate controller 238 can communicate with the smoke sensor 224, which has subsequently maintained its role as an end device, using a LoRaWAN primary protocol. Communications from the flex driveway gate controller 238 can be provided to the smoke sensor 224 or to the cellular Cat-M tower 216 depending on the conditions. Similarly, the smoke sensor 224 can communicate with the cellular Cat-M tower 216 over a cellular Cat-M second communications protocol.

In some implementations, the smoke sensor 224 can act as a secondary backhaul for the components of system 205, creating a hub-less configuration. For example, the battery powered cellular Cat-M secondary backhaul path makes a Ramble-based security system feasible when one or more components go down. For example, the smoke sensor 224, which is typically an end device a majority of the time, can allow its battery to last for extended periods of time, while the smoke sensor 224's cellular Cat-M communication protocol allows the smoke sensor 224 to always communicate with the server 202 even in the event of a power outage, as illustrated in system 205, or due to another reason, such as customer interference. In some examples, a smoke sensor 224 can enable further automation and security.

Figure 2E:
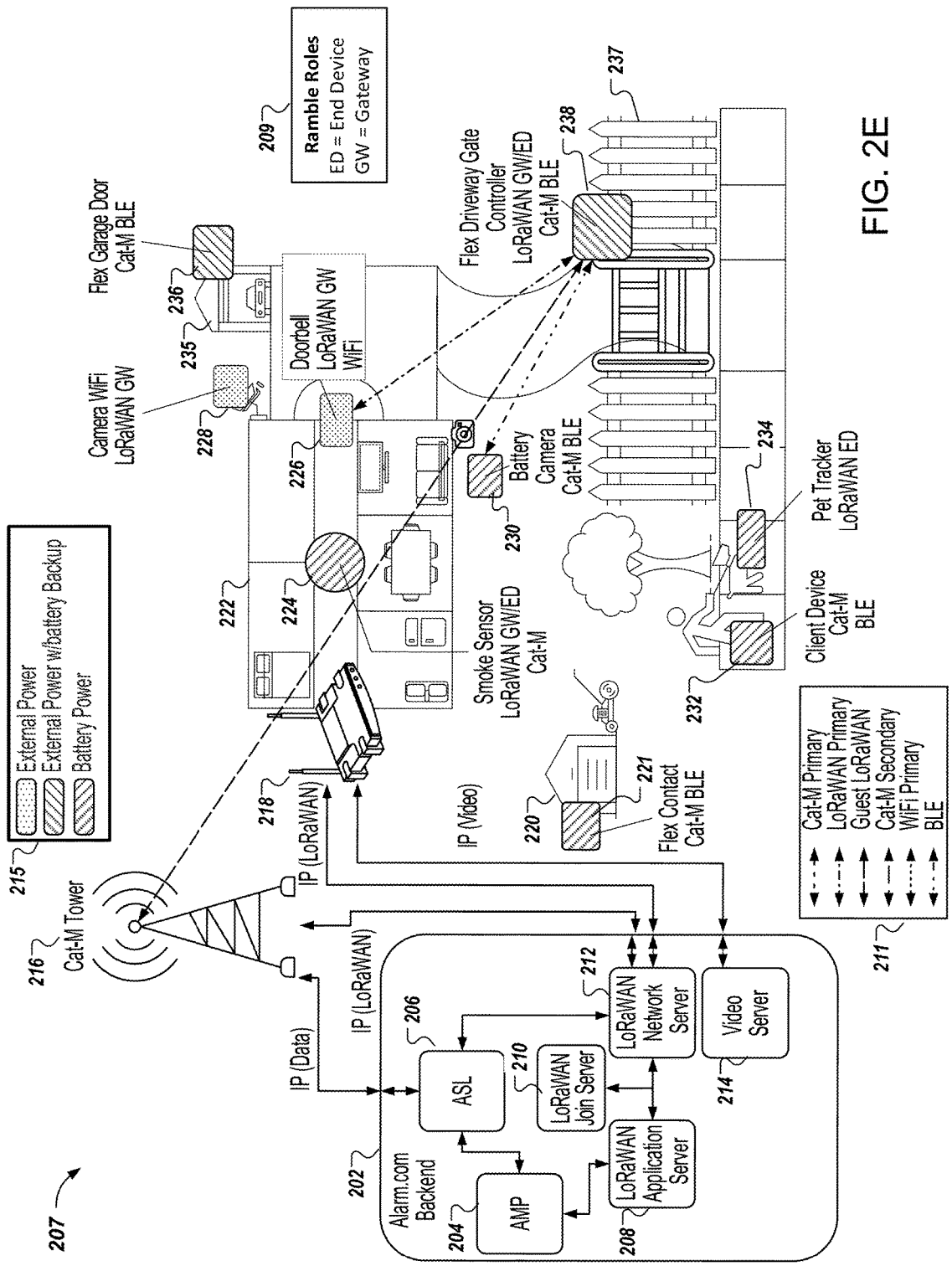
FIG. 2E is a block diagram that illustrates an example of a system for managing sensor communications in a home environment during a data request from a server.

FIG. 2E is a block diagram that illustrates an example of a system 207 for managing sensor communications in a home environment during a data request from a server. System 207 illustrates similar components and similar functionality to systems 200, 203, and 205. The similar components will not be described again here. System 207 illustrates how the sensors and devices of the home environment communicate with the server 202 in the event that the server 202 seeks to view video feed from the battery camera 230. Other examples are possible, such as, in the event that the server 202 wants to access real time data from the pet tracker 234, video feed from the video camera 228, or data from the client device 232.

In some implementations, each of the devices in the Ramble network of system 207 seek to operate at the lowest possible power to reduce processing and minimize an amount of network bandwidth utilized. These devices can operate only when requested upon, e.g., when the server 202 requests for data, or when the devices collect data that can be pushed to the server 202, e.g., video data from video camera 228, for example. Moreover, these devices seek to minimize power expenditure when communicating with the server 202. In this regard, some communication protocols can use greater power expenditure than others. For example, cellular communication protocols can enable the devices to draw more power than BLE protocols or LoRaWAN protocols.

As such, if a device recognizes that the server 202 requests for data, and the device has multiple communication protocols to communicate with the server, the device can initially select the communication protocol that draws the least amount of power. However, if the less power intensive communication protocol, e.g., BLE, is not connected to any other device, then the device may transmit data to the server using cellular Cat-M. In some implementations, if the device determines other devices that have active cellular backhauls are in range of its location, the device can forego using the cellular backhaul, and provide the data to one or more of the other devices that have active backhauls. In some cases, a device acting as a gateway can determine whether devices in range have an active backhaul when the device can provide an ACK response in the second receive window attesting to a lack of a backhaul. The device can attest to a lack of a backhaul assuming no other gateway performed an ACK during the first window and if the end device requested a "confirmed" or ACK'd response.

For example, as illustrated in system 207, the battery camera 230 may receive a request from the server 202 indicating a viewing of the live video feed of the battery camera 230. The server 202 can transmit the request over the cellular Cat-M tower 216 to the flex driveway gate controller 238 using the cellular Cat-M secondary communication protocol. The flex driveway gate controller 238 can provide the request to the battery camera 230. In response, the battery camera 230 can receive the request and determine its live video feed needs to be transmitted to the video server 214. The battery camera 230 can determine that its cellular Cat-M communication protocol is turned off. The battery camera 230 can determine that it is connected to the flex driveway gate controller 238 over a BLE communication protocol. Then, instead of turning on the cellular Cat-M communication protocol to communicate with the server 202, the battery camera 230 can determine that its BLE connection to the flex driveway gate controller 238 includes an active cellular backhaul, and that this means of transmitting data to the server 202 is less power expenditure than communicating over its own cellular backhaul. As such, the battery camera 230 can provide the live video feed to the server 202 through the BLE connection to the flex driveway gate controller 238, which provides data over the cellular Cat-M secondary communication protocol to the server 202 over the cellular Cat-M tower 216.

Similarly, the flex driveway gate controller 238 can act as other "middle man" for other devices in communicating with the server 202. For example, as illustrated in system 205, the doorbell 226 may communicate with the flex driveway gate controller 238 over LoRaWAN primary instead of using Wi-Fi to communicate with the router 218, as the Wi-Fi draws more power than communicating with the flex driveway gate controller 238. Although the flex driveway gate controller 238 can receive data over more than one protocol medium, the flex driveway gate controller 238 can translate the received data over different protocol mediums into data that is transmitted over a single communication medium, e.g., cellular Cat-M secondary, to the server 202. This is evident in the Ramble upload packet, such as the packet shown in frame structure 201, being agnostic and data can be communicated using any number of communication protocols.

Figure 3A:
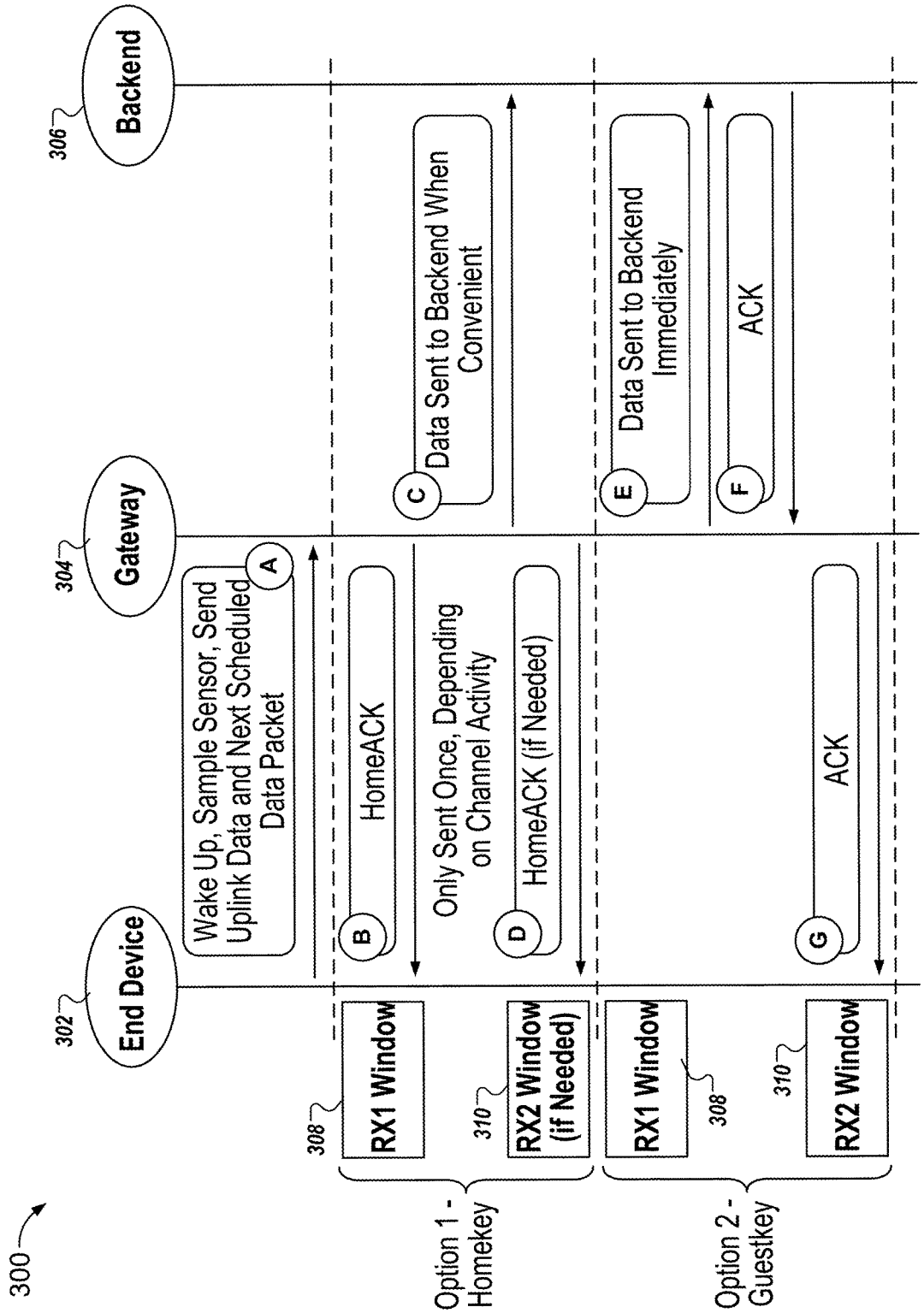
FIG. 3A is a flow diagram that illustrates an example of a process for transmitting an adhoc uplink pack from a sensor device to a backend based on the Ramble protocol.

FIG. 3A is a flow diagram that illustrates an example of a process 300 for transmitting an adhoc uplink packet from a sensor device to a backend based on the Ramble protocol. The process 300 illustrates how an adhoc uplink packet originating from an end device 302 is transmitted to a gateway 304, and subsequently transmitted to the backend 306. In one example, the end device 302 can correspond to a pet tracker, such as pet tracker 234, the gateway 304 can correspond to flex driveway gate controller 238, and the backend 306 can correspond to the server 202. Other examples are possible. FIG. 3A illustrates various operations in stages (A) through (G) which can be performed in the sequence indicated or another sequence.

In some implementations, an uplink packet sent from an end device can include the following parameters. The PHY-Payload, which corresponds to the data in the frame structure 201, airtime data, time data, frequency data, a data rate, a coding rate, a channel, an received signal strength indicator (RSSI), a signal to noise (SNR) ratio, and next transmission time. The airtime data indicates an airtime of uplink message in nanoseconds. The time corresponds to when a gateway received the message from the end device. Frequency corresponds to the frequency at which the end device transmitted the message. The data rate corresponds to the rate the data was transmitted. Coding rate corresponds to the coding rate of the data, e.g., 4/5 coding rate. The channel corresponds to the channel where the gateway received the message. RSSI corresponds to the signal strength of the received message. SNR corresponds to SNR of the received message. Lastly, next transmission time corresponds to the next known transmission time the end device will transmit data. Each of the data parameters can be included in an uplink packet so the server, such as server 202, can track the information associated with the end device and gateways.

During stage (A), when the end device 302 determines data, such as collected data, needs to be reported or transmitted to the backend 306, the end device 302 performs a set of functions. The end device 302 can wake up and sample the acquired or collected data. This data can correspond to video data. In some cases, the end device 302 can transmit encrypted packets at a fixed period, e.g., every 24 hours. Then, the end device 302 can encrypt the uplink data packet and transmit the encrypted data packet to the gateway 304.

During stage (B), in response to receiving the encrypted uplink data packet, the gateway 304 can transmit a HomeAck back to the end device 302, indicating that the generated uplink data packet was received. The HomeAck is transmitted by the gateway 304 that includes one or more fields related to a home device. For example, FIG. 3B illustrates exemplary frame structures 301 for an uplink HomeACK 303 and a downlink HomeAck 305. Typically, when the backend 306 provisions a HomeKey to an end device, such as end device 302, the backend 306 transmits a HomeKey to both the end device and corresponding gateways, which triggers productions of HomeACKs. For example, in response to the gateway 304 receiving the HomeKey, the gateway 304 transmits a HomeACK uplink to the backend 306 and a HomeACK downlink to the end device 302.

The HomeACK messages are intended to improve responsivity and battery life of end device 302, by delegating certain network server responsibilities to the gateway 304. Specifically, these responsibilities include an ability of the gateway 304 to exchange HomeACKs and ACKs and to indicate more data to the end device without to communicate with the LoRaWAN network server first. Returning, back to process 300, the gateway 304 can save the encrypted packet from the end device 302 in memory in response to receiving the encrypted packet.

In some implementations, if the gateway 304 notices the end device 302 utilizes a HomeKey for encrypting the data packet, then the gateway 304 can transmit a HomeAck back to the end device 302 during a first receive window at the end device 302.

During stage (C), the gateway 304 can transmit the decrypted data to backend 306 when convenient. The gateway 304 can transmit the decrypted data to the backend 306 when the gateway 304 is no longer receiving data from other components.

During stage (D), the gateway 304 can transmit another HomeAck to the end device 302 during a second receive window 310. The end device 302 can open the second receive window 310 if the end device 302 does not receive an ACK or a HomeACK during the first receive window 308.

During stage (E), the gateway 304 can notice that the encrypted packet transmitted by the end device 302 was encrypted with a GuestKey and not the HomeKey during stage (A), then the gateway 304 must forward the encrypted data packet to the LoRaWAN network server at the backend 306. The reason the gateway 304 provides the encrypted packet to the backend 306 is because the gateway 304 is not able to decrypt the packet encrypted with the HomeKey. This situation may arise when the end device 302 is associated with another network and is currently located external to their home network, such as communicating with a gateway located at a neighbor's home. In this case, the gateway 304 forwards the encrypted pack to the backend 306 so the LoRaWAN network server at the backend 306 can generate an ACK and subsequently receive and return the ACK to the end device 302 during a first receive window 308 or a second receive window 310. The backend 306 is able to decrypt the encrypted with a GuestKey. Typically, the second receive window 310 is used because a timing associated with the first receive window 308 will end before the backend 306 is able to return an ACK.

The ACK can correspond to a minimum packet size of 12 bytes plus a preamble length. This length ensures that the radios at the end devices and gateways minimize channel usages and retries. As such, the ACK packet size ensures that the ACK packet can be timely received in a time window defined by the first receive window 308 or a second receive window 310.

During stage (F), the backend 306 transmits an ACK to the gateway 304. The ACK can indicate to the gateway 304 that the backend server 306 has received the encrypted packet.

During stage (G), the gateway 304 can transmit the ACK received during stage (F) to the end device 302 during a particular receive window. The gateway 304 can transmit the ACK to the end device 302 during a particular window, e.g., first receive window 308 or second receive window 310, based on channel activity.

In some implementations, the gateways can use channel activity detection to monitor the radio frequencies in the environment. In particular, a radio can generally remain off for most of the time to reduce power usage, but can periodically wake up to check for radio frequency activity on a specific channel. The activity the radio uses for detection of radio frequency activity corresponds to the detection of a single preamble symbol. The value of periodicity for often the radio checks for channel is standard across each of the radios, and can be set by a designer of the Ramble protocol architecture.

Figure 3C:
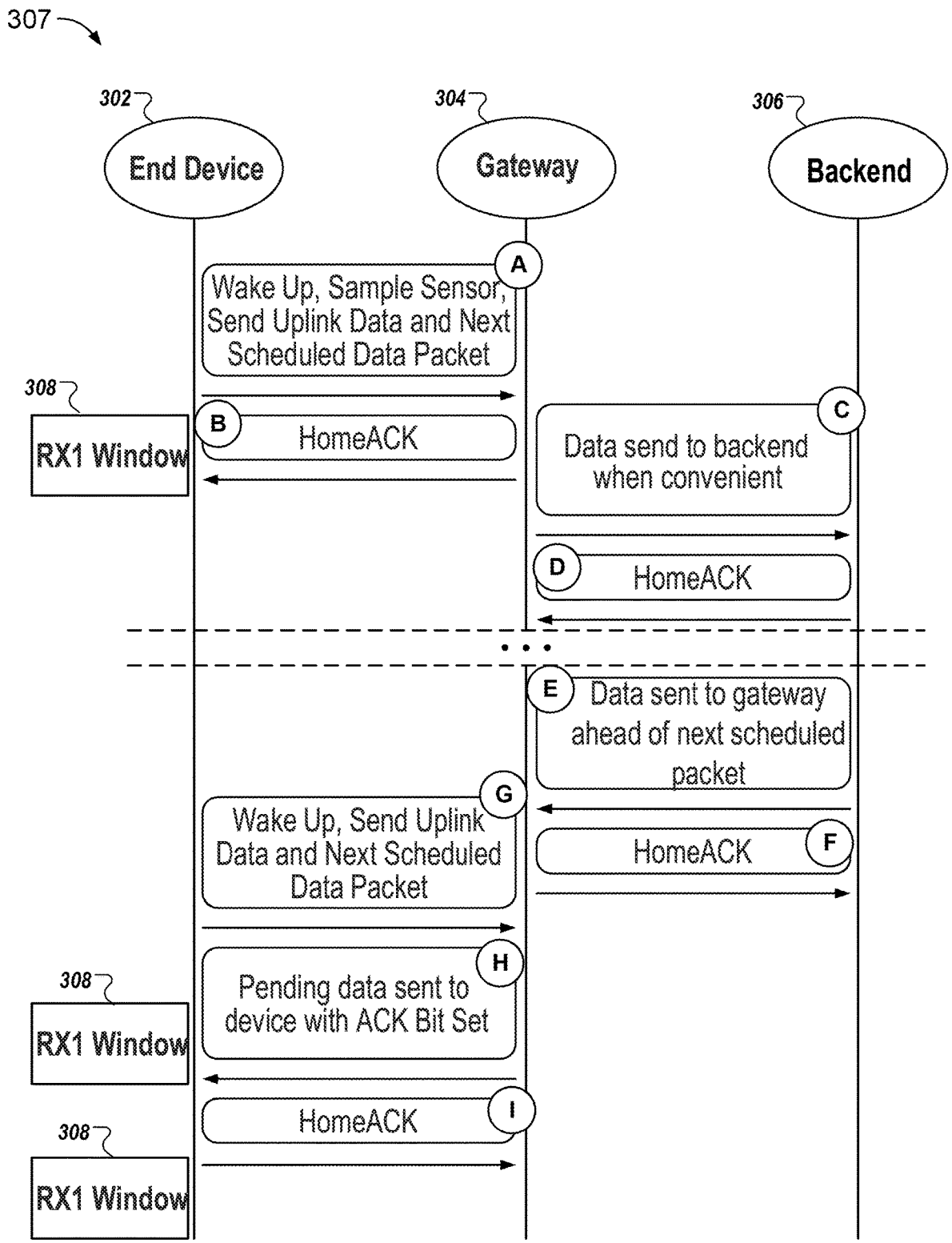
FIG. 3C is a block diagram that illustrates an example of a process for transmitting a scheduled uplink packet from a sensor device to a backend based on the Ramble protocol.

FIG. 3C is a block diagram that illustrates an example of a process 307 for transmitting a scheduled uplink packet from a sensor device to a backend based on the Ramble protocol. FIG. 3C illustrates similar components and similar functionality to FIG. 3A. FIG. 3C illustrates various operations in stages (A) through (I) which can be performed in the sequence indicated or in another sequence.

During stage (A), at a scheduled time, the end device 302 can report or transmit collected data to the backend 306. For example, at the scheduled time, the end device 302 can wake up and sample the acquired or collected data. The end device 302 can build an uplink data packet, such as the packet indicated with respect to stage (A) of process 300, and encrypt the generated uplink data packet with either the HomeKey or the GuestKey, depending on the provisioning by the backend 306. The end device 302 can transmit the encrypted packet to the gateway 304 at the time indicated by the scheduled time. However, the end device 302's transmission schedule is tolerant to a time drift within a threshold value.

The reason the end device 302 transmits the encrypted packet at the scheduled time is so the gateway 304 and the backend 306 can pre-seed downstream devices with pending packets. Pre-seeding downstream devices with pending packets can minimize network lag to deliver data to end devices that are not awake, maximize power savings, and minimize the overall network and end device becoming out of time synchronization. By knowing when the next end-device check in will happen, the backend 306 can transmit any pending data down to the gateway ahead of the checkin. This allows for efficient delivery of data to the end device without having to go all way back to the server. When multiple packets are being sent, the gateway 304 can make use of the FPending bit in the downlink PHYPayload frame structure, as illustrated in frame structure 201. The FPending bit indicates to the end device, during checkin, that the backend has more data for it and the end device should stay connected.

During stage (B), in response to receiving the encrypted uplink data packet, the gateway 304 can transmit a HomeAck back to the end device 302 during a first receive window 308, indicating that the generated uplink data packet was received. The HomeAck is transmitted by the gateway 304 that includes one or more fields related to a home device, such as when the uplink data packet is encrypted by the end device 302 using the HomeKey. The gateway 304 can decrypt the encrypted uplink data packet using the HomeKey to determine where to transmit the decrypted uplink data packet. Moreover, the gateway 304 can use a local rules engine functionality to locally decrypt and decode packets to determine packet contents and where to transmit the decoded and decrypted packets. For example, the local rules engine can perform functions such as turning lights on, send a special notification to a client device or the alarm panel, and other home security functions.

In some implementations, the LoRaWAN scheme can enable that gateways provide all received packets observed to the LoRaWAN network server located at the backend 306. However, to do this makes building a gateway on anything other than a broadband connection impractical, due to the number of duplicative network traffic created in a variety of situations. For example, multiple gateways can each hear many of the same packets from similar end devices. To address this situation, the gateways can perform local decoding to increase filtering of packets heading to the backend 306 by observing the contents and intelligently deciding if a packet is to be sent to the backend 306. For example, one technique to combat the issue of de-duplicative network traffic includes introducing the concept of silenced nodes to a gateway. A silenced node corresponds to nodes that are reliably communicating with other gateways within the process 300 and can tell the gateway that any received packet from the silenced nodes does not need to forward data traffic to the backend 306. In some examples, this flag from silence nodes can then be reversed if communications from the other gateways become unstable.

By providing the functionality of local decoding, devices in the Ramble network can roam from their home network to other networks, e.g., neighborly networks, and return back to the home network. These same local decoding features can be provided when the devices are found at the home network or when mobile and connected to neighborly networks.

In some implementations, the gateways can employ various channel modulation schemes to support dense data collections of end devices and gateways. The various channel module schemes can correspond to specific modulation techniques to employ when a gateway communicates with a vast number of devices, e.g., end devices and other gateways. For example, the specific modulation technique can include LoRa's adaptive data rate adjustment to have end devices limit their power and spread of message to avoid overlapping with other end devices. In some examples, the gateways can employ decreasing output power if the RSSI from each communicating end device is strong. In some examples, a gateway, which includes the use of a single channel, can listen on different channels or spreading factors when they cover various devices at the same location. By listening on different channels, secondary and tertiary channels can be used which increase throughput and bandwidth that can be supported by the Ramble network.

In some implementations, the single channel gateway can maintain an order of devices in case of a fail over scheme. For example, the single channel gateway can include a correct order of end devices in the case of a fail over scheme. The backend 306 can include intelligence and logic to determine when to open up secondary or tertiary channels in a given area when advisable and can determine when to adjust the transmit power of the end devices. This intelligence can include a prediction of whether additional channels are available based on the following: (i) a location of each of the gateways; (ii) a number of packets observed by each gateway in an area over periodic time intervals; (iii) a number of end devices whose packets have been observed by each gateway; (iv) an observed number of packet collision rates; (v) the location of the end devices; and (vi) the signal strength of incoming packets. In particular, the location of each of the gateways can be based on GNSS chips found in each of the gateways, using mobile device GNSS location at time of QR code reading during gateway installation, and the gateway can send messages over LoRa to be observed by other gateways then using LoRa's RSSI or ToA methods to estimate location.

During stage (C), the gateway 304 can transmit the decrypted uplink data packet to the backend 306 when convenient. The gateway 304 can transmit the decrypted data to the backend 306 when the gateway 304 is no longer receiving data from other components. For example, the gateway 304 does not have to delivery data to the backend 306 while the end device 302 is still connected. The end device 302 can disconnect and return to sleep while the gateway 304 can deliver the data to the backend 306.

During stage (D), the backend 306 can transmit a HomeACK indicating receipt of the uplink data packet to the gateway 304. The backend 306 transmits a HomeACK in the example that the end device 302 encrypts the uplink data packet with a HomeKey. Should the end device 302 encrypt the uplink data packet with the GuestKey, then the backend 306 would transmit an ACK, and not a HomeACK, to the gateway 304 that received the encrypted uplink data packet.

During stage (E), the backend 306 can transmit data to the gateway 304 ahead of a future scheduled packet transmitted by the end device 302. The data provided by the backend 306 can include, video data, collected data, or a confirmation, for example, from the backend 306 to provide to the end device 302. The data provided by the backend 306 can be in response to the request provided by the end device 302 during stage (A).

During stage (F), the gateway 304 can provide a HomeACK in response to receiving the data from the backend 306. The HomeACK provided by the gateway 304 can indicate that the gateway 304 received the data packet provided by the backend 306.

During stage (G), the end device 302 can, at a scheduled time, report or transmit out the next collected data to the gateway 304. For example, the scheduled time for the next collected data can be provided out at a time indicated by the end device 302 in the previous transmitted message from stage (A). Stage (G) is similar to stage (A).

During stage (H), the gateway 304 can transmit the pending data to the end device 302 during the first receive window 308. The pending data can correspond to the data the gateway 304 received during stage (E). The pending data transmitted by the gateway 304 can include an indication that the ACK bit has been set. The indication that the ACK bit has been set can inform the backend 306 is going to wait for an ACK. This is part of the information required to optimize network management and minimize energy usage by the end device 302.

In some implementations, end devices, such as end device 302, typically exist in a sleep state. Being in a sleep state makes the end devices not available for downlink messages. The exception to end devices not being available for downlink messages corresponds to the two receive windows opened by the end device just after the end device transmits an encrypted uplink data packet. The two receive windows correspond to first receive window 308 and second receive window 310. The two receive windows correspond to a time when the end device is listening for responses to the transmitted uplink messages. However, the length of time corresponding to the two receive windows can be short, which may be difficult for some backhaul protocols that communicate with the back end. If the LoRaWAN network server has pending data for an end device, then the corresponding gateway can be informed of this pending data.

Three methods exist in which the gateway is informed of pending data to provide to the end device. First, no staging is performed and the end device transmits the uplink message to the LoRaWAN network server over a backhaul protocol. The LoRaWAN network server can return any pending data with either the first receive window 308 or the second receive window 310. This manner includes a lowest latency of backhaul. In a second method, the gateway is informed of pending data from the backend server, but not the actual data packet. When the gateway receives the uplink message, the gateway would send the uplink message to the LoRaWAN network server, but return a HomeACK with the FPending bit set to the end device that transmitted the uplink message. Third, the gateway stages the first packet. When the gateway receives the uplink message, the gateway can send the uplink message to the LoRaWAN network server to retrieve the second packet while sending the first packet to the corresponding end device.

During stage (I), the end device 302 can transmit a HomeACK back to the gateway 304 to indicate that the pending data has been received. Process 307 can include a second receive window following the transmission of a HomeACK during stage (I). The end device 302 can open the first receive window 308 at the end to allow for a retransmission of the HomeACK if the gateway 304 does not receive the HomeACK. If gateway 304 does not receive the HomeACK, then the gateway 304 can transmit the pending data again until a HomeACK is received by the gateway 304 to confirm that the end device 302 received the pending data.

Figure 3D:
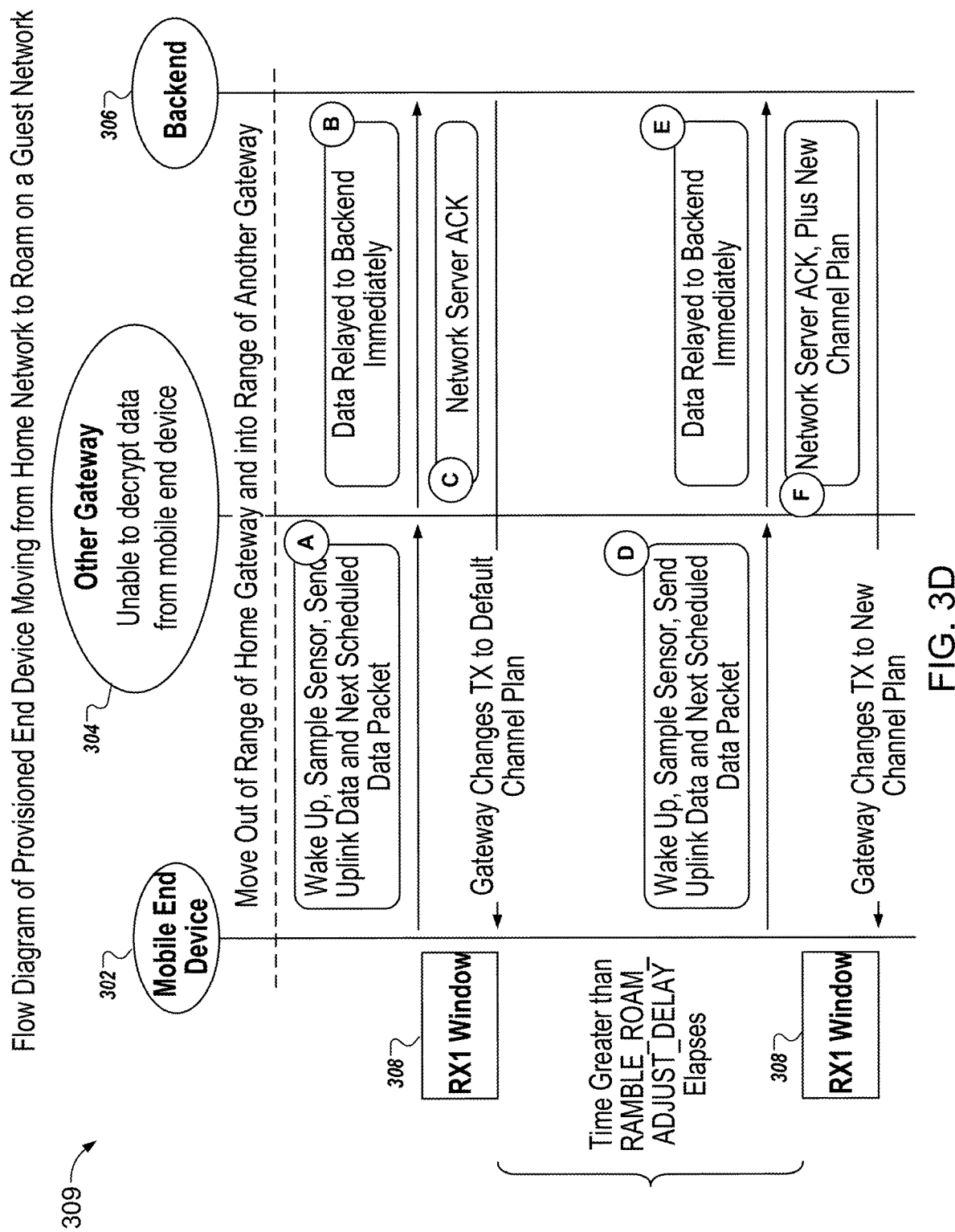
FIG. 3D is a block diagram that illustrates an example of a process for managing communications for a sensor device when the sensor device moves outside a home network based on the Ramble protocol.

FIG. 3D is a block diagram that illustrates an example of a process 309 for managing communications for a sensor device when the sensor device moves outside a home network based on the Ramble protocol. In some implementations, an end device 302 may move out of range of the home network yet still may desire to communicate with the backend 306. In this case, the end device 302 can communicate with other gateways in range as a guest device. Typically, an end device that moves out of range but has a cellular Cat-M protocol capability, can still communicate with the backend 306 with no issues. However, more adjustments may be necessary when end device 302 does not include cellular Cat-M protocol capability and moves out of communication range from the home network. FIG. 3D illustrates various operations in stages (A) through (F) which can be performed in the sequence indicated or another sequence.

In some implementations, when end device 302 moves out of communication range from a home network, a process is followed to ensure the end device 302 can still communicate with the backend 306. In particular, the end device 302 can move out of range from the home network and into range of neighborly home networks, e.g., from one subnet of the Ramble network to another subnet, and these neighborly home networks may include one or more Ramble gateways. If the end device 302 can detect the one or more Ramble gateways at the other home networks, then the end device 302 can communicate with the backend 306 using the one or more Ramble gateways at the neighborly home networks.

If the end device 302 moves out of range of the home network and cannot find one or more Ramble gateways at neighborly properties, then the end device 302 can take additional processes to connect to the backend 306. For example, the end device 302 can first attempt to re-sync with the backend 306 through an alternative backhaul if available, such as a cellular backhaul. The end device 302 in this case can retry transmitting on the alternative backhaul until an ACK timeout value is hit and then send a rejoin-request to request access to join the Ramble network.

If the end device 302 is operating on a modified channel plan, then the end device 302 can fall back to a default channel plan and retry transmitting on the alternative backhaul until an ACK timeout value is hit, and then send a rejoin-request message. In some examples, if the end device 302 is provisioned with a HomeKey, then the end device 302 can transition from using the HomeKey to using the GuestKey, and then subsequently send a Rejoin-request over the alternative backhaul. By using the Rejoin-request with a GuestKey rather than the HomeKey, the backend 306 can determine that the end device 302 is outside of the home network. Lastly, if the end device 302 has loaded alternative carrier settings, the end device 302 can seek to join a third party network and communicate to the backend 306 using the third party network. In the end, of none of the aforementioned processes work, the end device 302 can wait until the home Ramble network or a neighbor Ramble network is in range to communicate with the backend 306.

In some implementations, if end device 302 is operating with a GuestKey, then the end device 302 can correspond to a LoRaWAN device operating with a one channel gateway instead of a more bandwidth intensive eight-channel gateway. In this case, all traffic from the end device 302 is simply relayed to the LoRaWAN network server at the backend 306 through a local gateway. For example, the data packets can include the corresponding relevant data but no deciphering of the packet by the local gateways would be performed and no HomeACKs would be transmitted by the local gateways.

In some implementations, if an account on the backend 306 for an end device 302 is associated with multiple gateway devices and the end device 302 is within range of the multiple gateways, then the backend 306 may receive similar communications from both gateways. In this case, the LoRaWAN network server can perform de-duplication in ensuring that the same data is not processed multiple times. In the event that end device 302 only has a GuestKey and not a HomeKey, then the LoRaWAN network server has to perform the de-duplication of data processing.

In the alternative, where the end device 302 has a HomeKey and is associated with multiple gateways, then the end device 302 can transmit a data packet to the multiple gateways. The end device 302 can open a first receive window in response to transmitting the data packet to the multiple gateways. Each gateway in the multiple gateways can receive the data packet and transmit a HomeACK if enabled to the end device 302, such that the end device 302 receives the HomeACK during a time indicated by the first receive window. Then, each gateway of the multiple gateways transmits the packet received by the end device 302 to the LoRaWAN network server at the backend 306, which performs the process of de-duplication. If pending data exists at one or more of the gateways, then the LoRaWAN network server can inform the gateway with the strongest RSSI, which would prevent duplicate downlink messages. The LoRaWAN network server can elect to perform ADR and reduce the power of the end device 302 so that only one gateway is in range of the end device 302. The ability for an end device to talk to a gateway can be directly related to each side's radio output power. The higher the radio output power, the further away the signal can be "heard" or the further away a signal can be received. This technique describes the ability to reduce the output power of a gateway, such that the end device is still within reach but no further. This can be applied to nearby neighbor gateways such that the end device can only talk to one gateway, e.g., presumable the home gateway. This minimizes duplicate packets and unnecessary extra traffic.

During stage (A), as the mobile end device 302 moves out of range from the home network and within range of other neighbor networks that include other Ramble gateways, the mobile end device 302 can operate on a default or modified channel plan, as described above. The mobile end device 302 can determine whether other gateways are ramble capable based on the response the mobile end device 302 receives when sending out messages. Regardless of the channel plan, the mobile end device 302 can appear as a guest device to these other Ramble gateways, and the other Ramble gateways can act as a secure relay to the backend 306.

For example, as illustrated in process 309, the mobile end device 302 can move out of range of the home network and into range of the other network. The mobile end device 302 can wake up, sample and collect sensor data, generate an uplink data packet, encrypt the generated uplink data packet with the GuestKey and transmit the encrypted uplink data packet to the other gateway 304. The other gateway 304 can correspond to a Ramble gateway at another network separate from the home network.

During stage (B), the other gateway 304 can receive the encrypted uplink data packet from the mobile end device 302 and determine that a different encryption key was used to encrypt the received data packet. The other gateway 304 can store HomeKeys associated with end devices of its home network. If the other gateway 304 cannot decrypt the encrypted uplink packet with any of its stored HomeKeys, then the other gateway 304 can determine that this encrypted uplink packet is encrypted with a GuestKey. Consequently, the other gateway 304 can then forward the encrypted uplink packet to the backend 306 immediately.

During stage (C), the backend 306 can receive the encrypted uplink packet and in response transmit a network server ACK to the other gateway 304. Then, the backend 306 can decrypt the contents of the encrypted uplink packet with the GuestKey. When the other gateway 304 receives the network server ACK from the backend 306, the other gateway 304 can instruct the mobile end device 302 to change its transmission to a default channel plan. For example, the other gateway 304 transmits a notification to the mobile end device 302 during the received first receive window 308 that indicates the mobile end device 302 can change to a default channel plan.

In some implementations, if the mobile end device 302 and the other gateway 304 utilize a default channel plan, then the two devices continue to communicate as normal. In some implementations, if the end device 302 is using a default channel plan and the new gateway is using a modified channel plan, then after a delay has elapsed, e.g., a RAMBLE_ROAM_ADJUST_DELAY, then the LoRaWAN network server of the backend 306 can provision the mobile end device 302 with the modified channel plan. In some implementations, if the mobile end device 302 is using a modified channel plan and the other gateway 304 is using a default channel plan, then after the delay has elapsed, e.g., RAMBLE_ROAM_ADJUST_DELAY, the mobile end device 302 can use the default channel plan. If the mobile end device 302 succeeds in communicating with the other gateway 304 using the default channel plan, then the mobile end device 302 can invalidate the modified channel plan and continue using the default channel plan for future communications. The delay is used in case the mobile end device 302 is highly mobile and to prevent excessive re-adjustments of channel plans for the mobile end device 302 and the corresponding Ramble network.

In some implementations, the backend 306 can communicate with another gateway to ultimately reach the other gateway 304. For example, the LoRaWAN network server can communicate with a neighboring gateway that communicates with the other gateway 304. In doing this, the LoRaWAN network server can change the neighboring gateway to an end device and can pass a message to the other gateway 304 using the HomeKey associated with the other gateway 304, which would look like another GuestKey to the neighboring gateway. In this case, the neighboring gateway would relay the message to the other gateway 304 as the neighboring gateway would think the message is encrypted with a GuestKey. The purpose is to aid the other gateway 304 in establishing or troubleshoots a backhaul connection to the LoRaWAN network server in the event of a failure or a credential change associated with the Wi-Fi.

During stage (D), the mobile end device 302 can transmit the next scheduled data packet, e.g., encrypted uplink data packet, to the other gateway 304 using a default channel plan.

During stage (E), the other gateway 304 can receive the encrypted uplink data packet and relay the encrypted uplink data packet to the backend 306.

During stage (F), the backend 306 can provide a network server ACK and a new channel plan back to the other gateway 304. Then, the other gateway 304 can provide the response from the backend and an indication to change to a newchannel plan during a first receive window 308.

Figure 4:
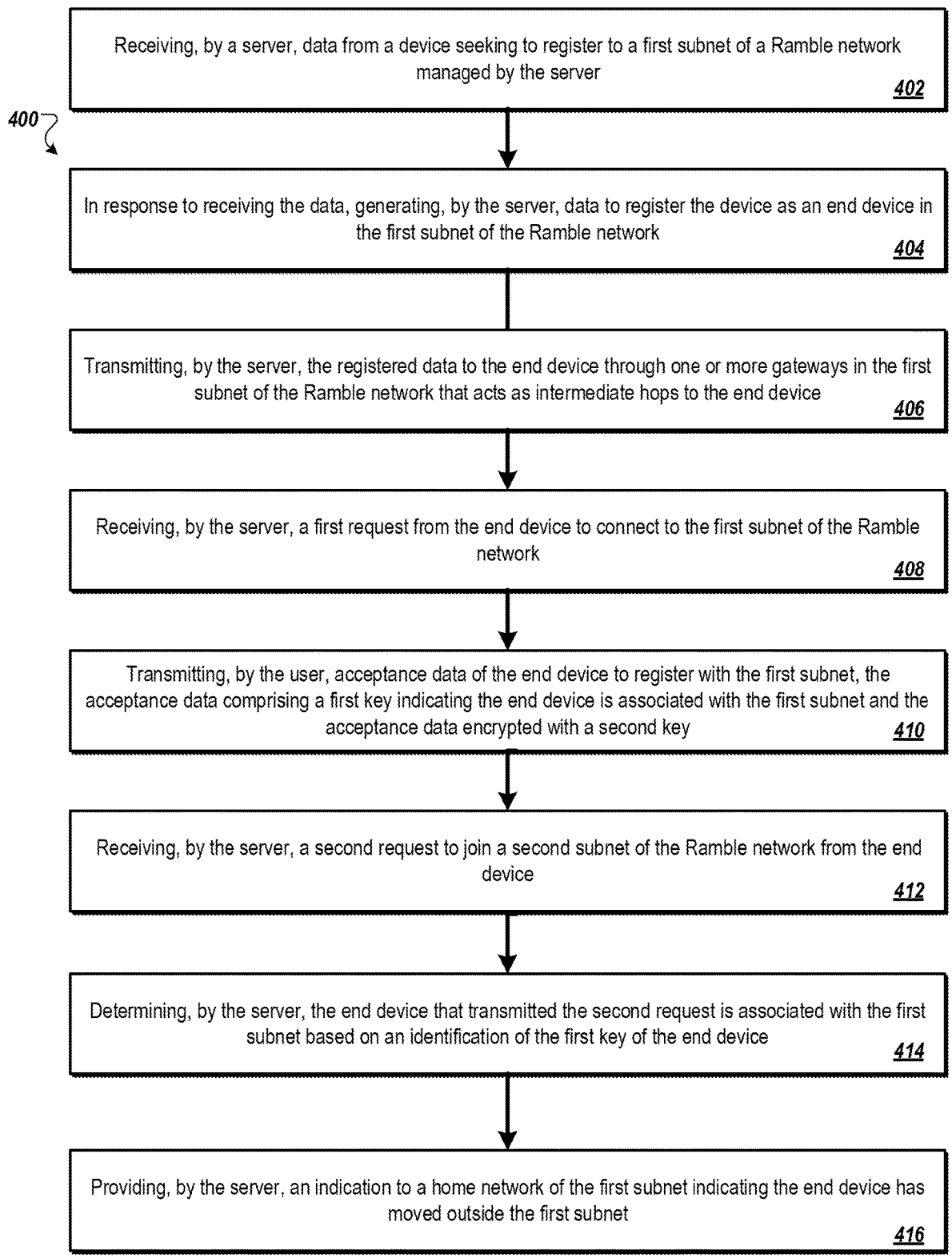
FIG. 4 is a flow diagram that illustrates an example of a process for managing sensor communications in a home environment.

FIG. 4 is a flow diagram that illustrates an example of a process 400 for managing sensor communications in a home environment. The process 400 can be performed by the server 102 of system 100, the server 202, and the backend 306.

The server can receive data from a device seeking to register to a first subnet of a Ramble network managed by the server (402). For example, the device can send one or messages that indicate a role of the device, a location of the device, and request for Wi-Fi credentials associated with a home network the device is seeking to register with. These messages can include, for example, ROLE_CAPABLE, ROLE_ACTIVE, ROLE_DEFAULT, WIFI CREDENTIALS, and LOCATION. In response to the server receiving these messages and analyzing the messages, the server can determine a particular role for the device and determine one or more protocols for the device to enable for operation.

In response to receiving the data, the server can generate data to register the device as an end device in the first subnet of the Ramble network (404). For example, the server can generate data to register the device as the end device based on the messages received from the device. The data can include a DevEUI identifier, a JoinEUI identifier, an AppKey/GuestKey, and an NwkKey. The DevEUI identifier can correspond to a globally unique MAC address that identifies the end device in the Ramble network. The JoinEUI identifier, which will be stored on the end device, can indicate to other devices in the Ramble network that the end device is a Ramble capable device. Guest devices or non-Ramble devices can use a separate JoinEUI identifier. The AppKey/GuestKey can be used to identify a user associated with the end device. In some examples, the AppKey/GuestKey can be used to encrypt the data to provide to the end device. The NwkKey can be used by the end device to encrypt any communications the device will have with a LoRaWAN Network Server. The server can generate data that indicates to the end device which protocols should be enabled, e.g., BLE, cellular Cat-M, and Wi-Fi, and other application settings.

The server can generate an account associated with the end device. The server can store in the account the generated data associated with the end device, e.g., a role of the device, the DevEUI identifier, the JoinEUI identifier, the AppKey/GuestKey, the NwkKey, protocols and application settings enabled for the device, and messages received from the device to register with the server. The server can use the account to manage and track communications from the end device, such as the location of device and when decrypting messages received from the end device.

The server can transmit the registered data to the end device through one or more gateways in the first subnet of the Ramble network that acts as intermediate hops to the end device (406). For example, the first subnet of the Ramble network can include one or more gateways that communicate with the server, the end device, and other end devices.

The one or more gateways can include video cameras (indoor and outdoor), doorbells, smoke sensors, garage door openers, and other devices found at the home property that can collect data and communicate with other devices in the home property.

The server can transmit the registered data to the end device through one or more gateways in the home network or the first subnet of the Ramble network. For example, the server can transmit the registered data over broadband to the one or more gateways in the home network. Alternatively, if the end device communicates over cellular, the server can transmit the registered data encrypted to the end device over a cellular protocol. In response to the device receiving the registration data, the device can transition its role to an end device and store the DevEUI identifier, the JoinEUI identifier, the AppKey/GuestKey, and the NwkKey. The new end device can enable or disable any of its protocols and set application parameters as instructed by the server.

The server can receive a first request from the end device to connect to the first subnet of the Ramble network (408). After receiving the registration data, the end device can transmit a request to the server to connect to and join the first subnet of the Ramble network. For example, the end device can transmit a Join Request message that is encrypted with the GuestKey. The Join Request message can indicate that a particular end device seeks to communicate with other gateways and end devices on the first subnet of the Ramble network.

The server can transmit acceptance data of the end device to register with the first subnet, the acceptance data comprising a first key indicating the device is associated with the first subnet and the acceptance data encrypted with a second key (410). In response to the server receiving the first request, the server can decrypt the first request with the GuestKey and decrypt contents of the first request. The server can determine the contents include a Join request message and the server can compare the contents in the Join request to the account associated with the end device to determine that the end device is associated with the first subnet of the Ramble network. In response, the server can generate a Join-accept message and encrypt the message with the second key, e.g., the AppKey. The Join-accept message can include a first key, e.g., the HomeKey, indicating the requesting end device is associated with the first subnet of the Ramble network. The server can transmit the acceptance data to the end device over the one or more gateways or directly to the end device over a cellular protocol.

The server can receive a second request to join a second subnet of the Ramble network from the end device (412). In some implementations, the end device can receive the encrypted acceptance data and decrypt the encrypted data with its stored GuestKey that was previously issued. The end device can extract the decrypted accepted contents and determine that the server has indicated it to use the HomeKey for subsequent communications. Although, the end device may not know a difference between the HomeKey and the GuestKey, the server can instruct the end device to use the HomeKey for subsequent communications. The server can transmit the same HomeKey to the gateways at the first subnet of the Ramble network to ensure these gateways have the ability to decrypt any message from the end device that have been encrypted with the HomeKey.

In one example, the end device can correspond to a pet tracker. The pet tracker may communicate with the gateways of the home network, e.g., the first subnet of the Ramble network, and communicate by sending data packets encrypted with the HomeKey. The data packets can correspond to an uplink packet that includes one or more fields and data collected by the pet tracker. The pet tracker may move to a location that is outside the first subnet of the Ramble network and can no longer communicate with the gateways or other end devices of the first subnet of the Ramble network as it is out of communication range. In this case, the pet tracker may seek to connect to the next closest gateway. The next closest gateway may be one or more gateways associated at another home property, e.g., a second subnet of the Ramble network. The other home property may include a subnet of the established Ramble network.

The pet tracker may determine if the one or more gateways associated at another home property are Ramble devices by querying for their JoinEUI identifier. If the pet tracker determines the one or more gateways associated at the home property include JoinEUI identifiers are indicative of Ramble devices, the pet tracker can transmit a Join request to a gateway of the second subnet of the Ramble network to connect to the second subnet of the Ramble network. In response, the gateway of the second subnet of the Ramble network can receive the message, a Join request message, which is encrypted with the pet tracker's HomeKey, and can seek to decrypt with its stored HomeKeys. If the gateway of the second subnet of the Ramble network cannot decrypt the message with any of its stored HomeKeys, then the gateway can forward the encrypted message to the server. The gateway may store HomeKeys for end devices associated with its subnet network, e.g., second subnet of the Ramble network, but does not store HomeKeys associated with other subnet networks, e.g., first subnet of the Ramble network. The server can communicate with multiple subnets of the Ramble networks at different home properties. In response, the server can receive the encrypted message from the gateway at the second subnet of the Ramble network.

The server can determine the end device that transmitted the second request is associated with the first subnet of the Ramble network based on an identification of the first key of the end device (414). In particular, the server can determine that the encrypted message is encrypted with a HomeKey from the first subnet of the Ramble network, but the encrypted message was received from a gateway associated with the second subnet of the Ramble network. Moreover, the server can determine that the HomeKey to decrypt the encrypted message belongs to the end device associated with the first Ramble network. The second request can correspond to a Join request message from the end device seeking to connect to the second subnet of the Ramble network. The second subnet of the Ramble network can correspond to a Ramble network at a neighbor's home, for example. The server can determine that the end device is outside the first subnet of the Ramble network because the end device is seeking to connect to the second subnet of the Ramble network when a HomeKey has already been issued to the end device for the first subnet of the Ramble network. The server can use the contents of the second message and an account associated with the end device to determine that the end device is outside the first Ramble network.

The server can provide an indication to a home network of the first subnet indicating the end device has moved outside the first subnet (416). The server can transmit an indication to the end device at the second subnet of the Ramble network, e.g., over one or more gateways at the second subnet of the Ramble network, to revert to using the GuestKey for future communications instead of using the HomeKey. The GuestKey enables the end device to roam to other subnet networks and still be able to communicate with the server. Here, the end device can encrypt future communications with the GuestKey, which gateways at the other Ramble networks will not be able to decrypt, and provide those communications securely to the server. The server can instruct the end device to use the GuestKey so the server is aware that the end device is located outside of the first Ramble network for future communications. In some implementations, the server does not re-provision the end device with the GuestKey, when the end device roams to other Ramble networks. Rather, the backend can treat communications from that end device as a GuestKey. Moreover, the backend can determine, via a MAC address or other identification, a type of the end device that roamed to another subnet and which subnet that end device actually belongs.

The server can transmit a second indication to a home network of the first subnet of the Ramble network indicating that the end device has moved away from the first subnet network. The second indication can be issued as a warning, for example. For example the second indication to the home network of the first subnet network can indicate that the pet tracker or the pet has ran away from the home property associated with the first subnet network.

In some implementations, when the end device returns to the first subnet network, the end device can send a message to connect to the first subnet network. As the gateways of the first subnet network are closer to the end device than the gateways of the second subnet network, the end device can transmit a Join request to the gateways of the first subnet network. If the Join request message is encrypted with the GuestKey, the gateway can forward the encrypted message to the server where the server can determine that the end device is seeking to connect to the first subnet network again. The server can provide an indication to the end device to use the HomeKey for future communications and so the server is aware that the end device is now connected and located near the first Ramble network. Alternatively, if the end device transmits the message encrypted with the HomeKey to a gateway when returning to the first subnet network, the gateway can properly decrypt the message and determine actions to take without having to alert the server. In some cases, the end device may continue to use the HomeKey while connected to the second Ramble network. The HomeKey will look like a GuestKey to the gateways at the second Ramble network. This process can ensure a removal of a pre-provisioning step when the mobile device returns to the home gateway. The gateways at the second Ramble network can act as a pass through, so the backend would track which device has which encryption key and use the appropriate key.

Figure 5:
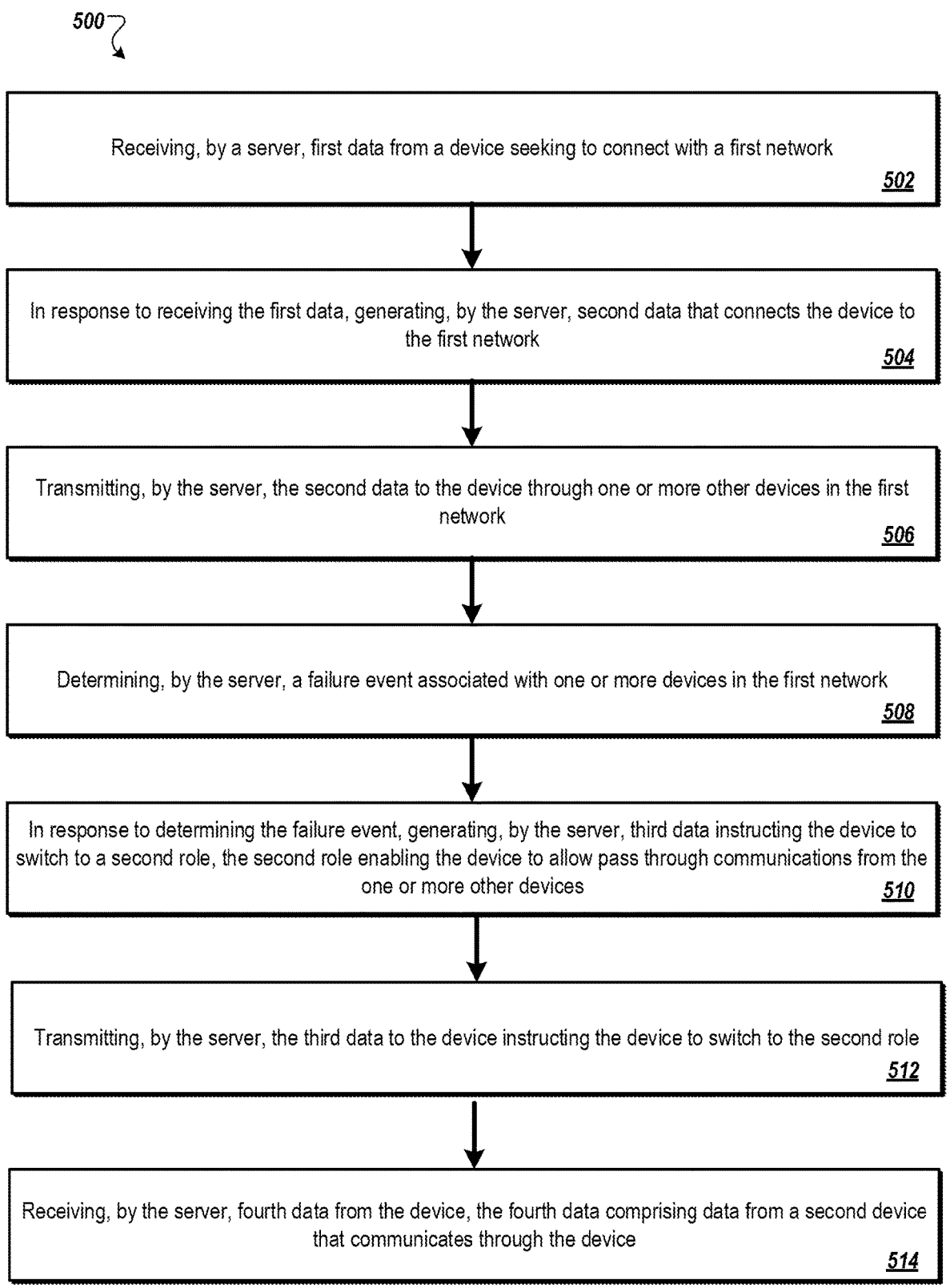
FIG. 5 is another flow diagram that illustrates an example of a process for managing sensor communications in a home environment.

FIG. 5 is another flow diagram that illustrates an example of a process 500 for managing sensor communications in a home environment. The process 500 can be performed by the server 102 of system 100, the server 202, and the backend 306.

The server can receive first data from a device seeking to connect with a first network (502). Specifically, the device can first seek to register with the first network through the server. The process for registering is described with respect to stages (402) through (406). After (406), the device can be configured as either an end device or a gateway device. After the device has registered with the network, the device can transmit a Join Request message to connect to and join the first network. For example, the first network can be a first subnet of a Ramble network. In this manner, the device can transmit a Join Request message that is encrypted with the GuestKey. The Join Request message can indicate to the server that a particular device seeks to communicate with other devices on the first network.

In response to receiving the first data, the server can generate second data that connects the device to the first network (504). In response to receiving the first data from the device, the server can decrypt an outer layer of the first data with a corresponding GuestKey and subsequently, decrypt the contents of the first data. In response to decrypting the contents of the first data, the server can determine the contents include a Join request message. The server can compare the contents in the Join request message to the account associated with the device to determine the device has been registered with the first network, e.g., Ramble network. In response, the server can generate a Join-accept message and encrypt the message with a second key, e.g., an AppKey. The join-accept message can allow any pre-approved non-Ramble device to operate and communicate on the Ramble network. The parameters of the join-accept message can include, for example, a maximum MAC Payload size, a channel width, a power spectral density, a conducted output power of an end-device, a preamble sync word, a preamble length ok word, a preamble length CAD word, Ramble roam adjust delay, and a Ramble roam search delay. Moreover, the Join-accept message can include a first key, e.g., the HomeKey, indicating the requesting device is associated with the first network.

The server can transmit the second data to the device through one or more other devices in the first network (506). Specifically, the server can transmit the second data, e.g., the encrypted join-accept message to the device. The device can receive the encrypted join-accept message and decrypt the encrypted data with its stored GuestKey that was previously issued during the registration process. In the case the device has been configured as an end device, the device can then extract the decrypted accepted contents and determine that the server has indicated that the HomeKey should now be used for subsequent communications. In the case the device has been configured as a gateway, the device can receive a HomeKey that was transmitted to other end devices in the first network to ensure the device has the ability to decrypt any message from other end devices that have been encrypted with the same HomeKey.

The server can determine a failure event associated with one or more devices in the first network (508). In some implementations, the server can determine that a particular failure is causing one or more devices in the first network to change its communication medium or stop communicating altogether. For example, a failure event can include a broken broadband connection, a Wi-Fi credential change, a power issue with a router, corrupted protocol, and/or power outages. In some examples, the server can determine that an end device or a gateway device has not communicated in a predetermined period of time. In some examples, the server can determine that a particular device is communicating over a cellular backhaul medium rather than through a Wi-Fi device. In this example, the server can infer the Wi-Fi device may have a failure event, e.g., changed credentials, a power outage, or other form of failure. In some examples, the server can receive a notification from an end device or a gateway indicating a primary path failure with one or more devices of the network.

In response to determining the failure event, the server can generate third data instructing the device to switch to a second role, the second role enabling the device allow pass through communications from the one or more other devices (510). For example, in response to determining a failure event, the server can update an account associated with a particular device to change roles from an end device to a gateway or from a gateway to an end device. The server can generate data for the account that changes the device's role. The server can change the device's role and generate an instructional data that switches the device from a gateway to an end device or vice versa.

In one scenario, if three end devices communicate with a Wi-Fi router that acts as a gateway in a particular network, and the server determines the Wi-Fi router fails due to one or more factors, then the server can change a role of at least one of those end devices to a gateway based on various criteria. If the server determines that one of those end devices has a cellular backhaul, then the server can generate data to instruct that end device to be configured as a gateway. Then, the other two end devices can communicate through the device now configured as a gateway, and that newly configured device can communicate data from the other two devices over the cellular backhaul to the server. Other examples are possible. In this manner, network communications can still be preserved in the case where the server determines a failure event in the network.

The server can transmit the third data to the device instructing the device to switch to the second role (512). In response to generating the instruction to switch a device that is configured an end device to a gateway, or to switch a device that is configured as a gateway to an end device, the server can transmit the instructional data to the corresponding device. For example, the server can transmit a ROLE_ACTIVE message to the particular device that indicates which a role a device should be configured.

The server can receive fourth data from the device, the fourth data comprising data from a second device that communicates through the device (514). In response to configuring the device as a new role, the server can receive data from the newly configured device. In the example the device has been newly configured as an end device, the server can receive data from the end device itself. In the example the device has been newly configured as a gateway, the server can receive data from the gateway device, that data includes data from other end devices that now communicate through the newly configured gateway device.

Figure 6:
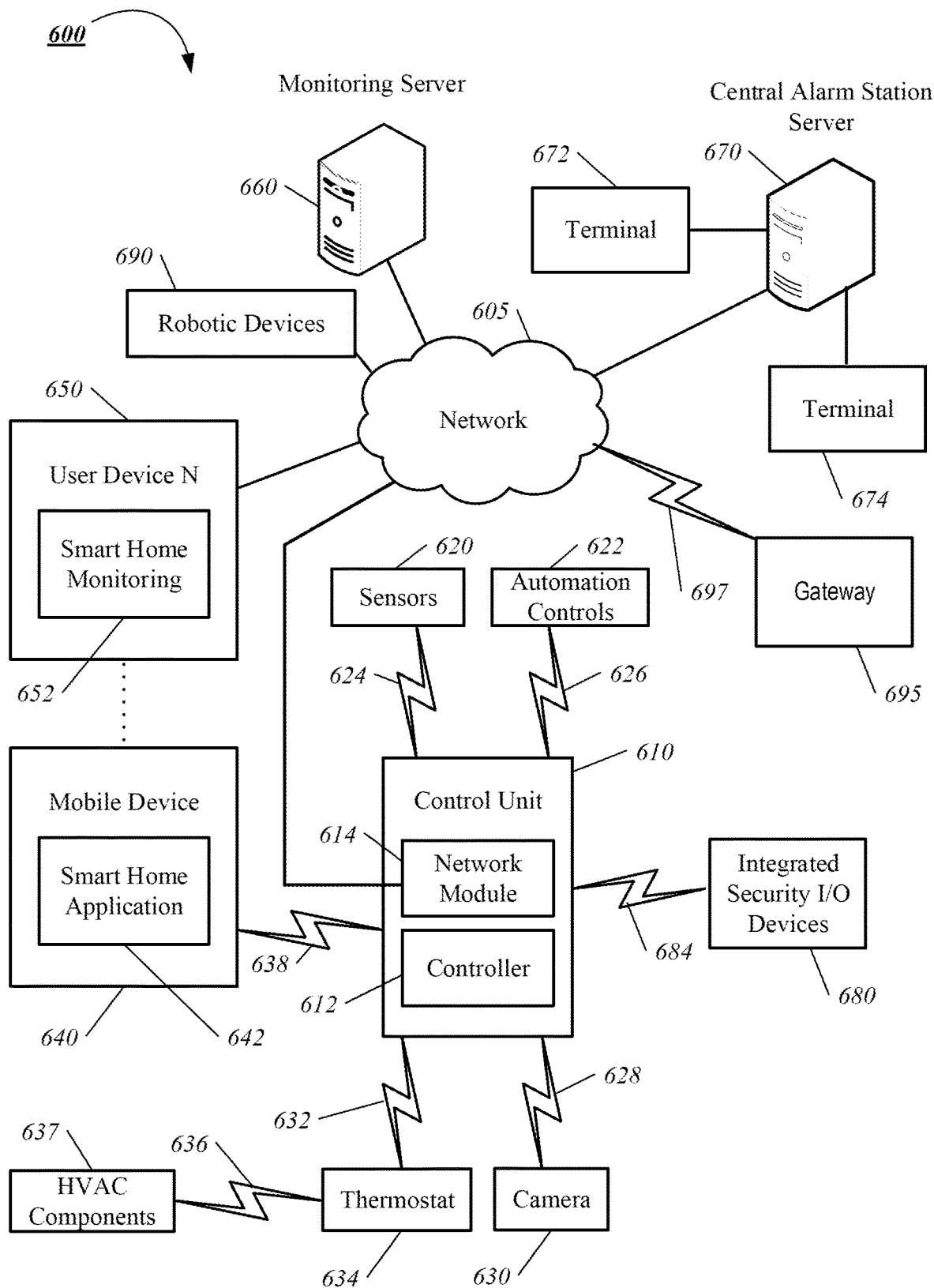
FIG. 6 is a diagram illustrating an example of a home monitoring system.

FIG. 6 is a diagram illustrating an example of a home monitoring system 600. The monitoring system 600 includes a network 605, a control unit 610, one or more user devices 640 and 650, a monitoring server 660, and a central alarm station server 670. In some examples, the network 605 facilitates communications between the control unit 610, the one or more user devices 640 and 650, the monitoring server 660, and the central alarm station server 670.

The network 605 is configured to enable exchange of electronic communications between devices connected to the network 605. For example, the network 605 may be configured to enable exchange of electronic communications between the control unit 610, the one or more user devices 640 and 650, the monitoring server 660, and the central alarm station server 670. The network 605 may include, for example, one or more of the Internet, Wide Area Networks (WANs), Local Area Networks (LANs), analog or digital wired and wireless telephone networks (e.g., a public switched telephone network (PSTN), Integrated Services Digital Network (ISDN), a cellular network, and Digital Subscriber Line (DSL)), radio, television, cable, satellite, or any other delivery or tunneling mechanism for carrying data. Network 605 may include multiple networks or subnetworks, each of which may include, for example, a wired or wireless data pathway. The network 605 may include a circuit-switched network, a packet-switched data network, or any other network able to carry electronic communications (e.g., data or voice communications). For example, the network 605 may include networks based on the Internet protocol (IP), asynchronous transfer mode (ATM), the PSTN, packet-switched networks based on IP, X.25, or Frame Relay, or other comparable technologies and may support voice using, for example, VoIP, or other comparable protocols used for voice communications. The network 605 may include one or more networks that include wireless data channels and wireless voice channels. The network 605 may be a wireless network, a broadband network, or a combination of networks including a wireless network and a broadband network.

The control unit 610 includes a controller 612 and a network module 614. The controller 612 is configured to control a control unit monitoring system (e.g., a control unit system) that includes the control unit 610. In some examples, the controller 612 may include a processor or other control circuitry configured to execute instructions of a program that controls operation of a control unit system. In these examples, the controller 612 may be configured to receive input from sensors, flow meters, or other devices included in the control unit system and control operations of devices included in the household (e.g., speakers, lights, doors, etc.). For example, the controller 612 may be configured to control operation of the network module 614 included in the control unit 610.

The network module 614 is a communication device configured to exchange communications over the network 605. The network module 614 may be a wireless communication module configured to exchange wireless communications over the network 605. For example, the network module 614 may be a wireless communication device configured to exchange communications over a wireless data channel and a wireless voice channel. In this example, the network module 614 may transmit alarm data over a wireless data channel and establish a two-way voice communication session over a wireless voice channel. The wireless communication device may include one or more of a LTE module, a GSM module, a radio modem, cellular transmission module, or any type of module configured to exchange communications in one of the following formats: LTE, GSM or GPRS, CDMA, EDGE or EGPRS, EV-DO or EVDO, UMTS, or IP.

The network module 614 also may be a wired communication module configured to exchange communications over the network 605 using a wired connection. For instance, the network module 614 may be a modem, a network interface card, or another type of network interface device. The network module 614 may be an Ethernet network card configured to enable the control unit 610 to communicate over a local area network and/or the Internet. The network module 614 also may be a voice band modem configured to enable the alarm panel to communicate over the telephone lines of Plain Old Telephone Systems (POTS).

The control unit system that includes the control unit 610 includes one or more sensors. For example, the monitoring system may include multiple sensors 620. The sensors 620 may include a lock sensor, a contact sensor, a motion sensor, or any other type of sensor included in a control unit system. The sensors 620 also may include an environmental sensor, such as a temperature sensor, a water sensor, a rain sensor, a wind sensor, a light sensor, a smoke detector, a carbon monoxide detector, an air quality sensor, etc. The sensors 620 further may include a health monitoring sensor, such as a prescription bottle sensor that monitors taking of prescriptions, a blood pressure sensor, a blood sugar sensor, a bed mat configured to sense presence of liquid (e.g., bodily fluids) on the bed mat, etc. In some examples, the health-monitoring sensor can be a wearable sensor that attaches to a user in the home. The health-monitoring sensor can collect various health data, including pulse, heart rate, respiration rate, sugar or glucose level, bodily temperature, or motion data.

The sensors 620 can also include a radio-frequency identification (RFID) sensor that identifies a particular article that includes a pre-assigned RFID tag.

The control unit 610 communicates with the home automation controls 622 and a camera 630 to perform monitoring. The home automation controls 622 are connected to one or more devices that enable automation of actions in the home. For instance, the home automation controls 622 may be connected to one or more lighting systems and may be configured to control operation of the one or more lighting systems. In addition, the home automation controls 622 may be connected to one or more electronic locks at the home and may be configured to control operation of the one or more electronic locks (e.g., control Z-Wave locks using wireless communications in the Z-Wave protocol). The home automation controls 622 may be connected to one or more appliances at the home and may be configured to control operation of the one or more appliances. The home automation controls 622 may include multiple modules that are each specific to the type of device being controlled in an automated manner. The home automation controls 622 may control the one or more devices based on commands received from the control unit 610. For instance, the home automation controls 622 may cause a lighting system to illuminate an area to provide a better image of the area when captured by a camera 630.

The camera 630 may be a video/photographic camera or other type of optical sensing device configured to capture images. For instance, the camera 630 may be configured to capture images of an area within a building or home monitored by the control unit 610. The camera 630 may be configured to capture single, static images of the area and also video images of the area in which multiple images of the area are captured at a relatively high frequency (e.g., thirty images per second). The camera 630 may be controlled based on commands received from the control unit 610.

The camera 630 may be triggered by several different types of techniques. For instance, a Passive Infra-Red (PIR) motion sensor may be built into the camera 630 and used to trigger the camera 630 to capture one or more images when motion is detected. The camera 630 also may include a microwave motion sensor built into the camera and used to trigger the camera 630 to capture one or more images when motion is detected. The camera 630 may have a "normally open" or "normally closed" digital input that can trigger capture of one or more images when external sensors (e.g., the sensors 620, PIR, door/window, etc.) detect motion or other events. In some implementations, the camera 630 receives a command to capture an image when external devices detect motion or another potential alarm event. The camera 630 may receive the command from the controller 612 or directly from one of the sensors 620.

In some examples, the camera 630 triggers integrated or external illuminators (e.g., Infra-Red, Z-wave controlled "white" lights, lights controlled by the home automation controls 622, etc.) to improve image quality when the scene is dark. An integrated or separate light sensor may be used to determine if illumination is desired and may result in increased image quality.

The camera 630 may be programmed with any combination of time/day schedules, system "arming state", or other variables to determine whether images should be captured or not when triggers occur. The camera 630 may enter a low-power mode when not capturing images. In this case, the camera 630 may wake periodically to check for inbound messages from the controller 612. The camera 630 may be powered by internal, replaceable batteries if located remotely from the control unit 610. The camera 630 may employ a small solar cell to recharge the battery when light is available. Alternatively, the camera 630 may be powered by the controller's 612 power supply if the camera 630 is co-located with the controller 612.

In some implementations, the camera 630 communicates directly with the monitoring server 660 over the Internet. In these implementations, image data captured by the camera 630 does not pass through the control unit 610 and the camera 630 receives commands related to operation from the monitoring server 660.

The system 600 also includes thermostat 634 to perform dynamic environmental control at the home. The thermostat 634 is configured to monitor temperature and/or energy consumption of an HVAC system associated with the thermostat 634, and is configured to provide control of environmental (e.g., temperature) settings. In some implementations, the thermostat 634 can receive data relating to activity at a home and/or environmental data at a home, e.g., at various locations indoors and outdoors at the home. The thermostat 634 can directly measure energy consumption of the HVAC system associated with the thermostat, or can estimate energy consumption of the HVAC system associated with the thermostat 634, for example, based on detected usage of one or more components of the HVAC system associated with the thermostat 634. The thermostat 634 can communicate temperature and/or energy monitoring information to or from the control unit 610 and can control the environmental (e.g., temperature) settings based on commands received from the control unit 610.

In some implementations, the thermostat 634 is a dynamically programmable thermostat and can be integrated with the control unit 610. For example, the dynamically programmable thermostat 634 can include the control unit 610, e.g., as an internal component to the dynamically programmable thermostat 634. In addition, the control unit 610 can be a gateway device that communicates with the dynamically programmable thermostat 634. In some implementations, the thermostat 634 is controlled via one or more home automation controls 622.

A module 637 is connected to one or more components of an HVAC system associated with a home, and is configured to control operation of the one or more components of the HVAC system. In some implementations, the module 637 is also configured to monitor energy consumption of the HVAC system components, for example, by directly measuring the energy consumption of the HVAC system components or by estimating the energy usage of the one or more HVAC system components based on detecting usage of components of the HVAC system. The module 637 can communicate energy monitoring information and the state of the HVAC system components to the thermostat 634 and can control the one or more components of the HVAC system based on commands received from the thermostat 634.

In some examples, the system 600 further includes one or more robotic devices 690. The robotic devices 690 may be any type of robots that are capable of moving and taking actions that assist in home monitoring. For example, the robotic devices 690 may include drones that are capable of moving throughout a home based on automated control technology and/or user input control provided by a user. In this example, the drones may be able to fly, roll, walk, or otherwise move about the home. The drones may include helicopter type devices (e.g., quad copters), rolling helicopter type devices (e.g., roller copter devices that can fly and roll along the ground, walls, or ceiling) and land vehicle type devices (e.g., automated cars that drive around a home). In some cases, the robotic devices 690 may be devices that are intended for other purposes and merely associated with the system 600 for use in appropriate circumstances. For instance, a robotic vacuum cleaner device may be associated with the monitoring system 600 as one of the robotic devices 690 and may be controlled to take action responsive to monitoring system events.

In some examples, the robotic devices 690 automatically navigate within a home. In these examples, the robotic devices 690 include sensors and control processors that guide movement of the robotic devices 690 within the home. For instance, the robotic devices 690 may navigate within the home using one or more cameras, one or more proximity sensors, one or more gyroscopes, one or more accelerometers, one or more magnetometers, a global positioning system (GPS) unit, an altimeter, one or more sonar or laser sensors, and/or any other types of sensors that aid in navigation about a space. The robotic devices 690 may include control processors that process output from the various sensors and control the robotic devices 690 to move along a path that reaches the desired destination and avoids obstacles. In this regard, the control processors detect walls or other obstacles in the home and guide movement of the robotic devices 690 in a manner that avoids the walls and other obstacles.

In addition, the robotic devices 690 may store data that describes attributes of the home. For instance, the robotic devices 690 may store a floorplan and/or a three-dimensional model of the home that enables the robotic devices 690 to navigate the home. During initial configuration, the robotic devices 690 may receive the data describing attributes of the home, determine a frame of reference to the data (e.g., a home or reference location in the home), and navigate the home based on the frame of reference and the data describing attributes of the home. Further, initial configuration of the robotic devices 690 also may include learning of one or more navigation patterns in which a user provides input to control the robotic devices 690 to perform a specific navigation action (e.g., fly to an upstairs bedroom and spin around while capturing video and then return to a home charging base). In this regard, the robotic devices 690 may learn and store the navigation patterns such that the robotic devices 690 may automatically repeat the specific navigation actions upon a later request.

In some examples, the robotic devices 690 may include data capture and recording devices. In these examples, the robotic devices 690 may include one or more cameras, one or more motion sensors, one or more microphones, one or more biometric data collection tools, one or more temperature sensors, one or more humidity sensors, one or more air flow sensors, and/or any other types of sensors that may be useful in capturing monitoring data related to the home and users in the home. The one or more biometric data collection tools may be configured to collect biometric samples of a person in the home with or without contact of the person. For instance, the biometric data collection tools may include a fingerprint scanner, a hair sample collection tool, a skin cell collection tool, and/or any other tool that allows the robotic devices 690 to take and store a biometric sample that can be used to identify the person (e.g., a biometric sample with DNA that can be used for DNA testing).

In some implementations, the robotic devices 690 may include output devices. In these implementations, the robotic devices 690 may include one or more displays, one or more speakers, and/or any type of output devices that allow the robotic devices 690 to communicate information to a nearby user.

The robotic devices 690 also may include a communication module that enables the robotic devices 690 to communicate with the control unit 610, each other, and/or other devices. The communication module may be a wireless communication module that allows the robotic devices 690 to communicate wirelessly. For instance, the communication module may be a Wi-Fi module that enables the robotic devices 690 to communicate over a local wireless network at the home. The communication module further may be a 900 MHz wireless communication module that enables the robotic devices 690 to communicate directly with the control unit 610. Other types of short-range wireless communication protocols, such as Bluetooth, Bluetooth LE, Z-wave, Zigbee, etc., may be used to allow the robotic devices 690 to communicate with other devices in the home. In some implementations, the robotic devices 690 may communicate with each other or with other devices of the system 600 through the network 605.

The robotic devices 690 further may include processor and storage capabilities. The robotic devices 690 may include any suitable processing devices that enable the robotic devices 690 to operate applications and perform the actions described throughout this disclosure. In addition, the robotic devices 690 may include solid-state electronic storage that enables the robotic devices 690 to store applications, configuration data, collected sensor data, and/or any other type of information available to the robotic devices 690.

The robotic devices 690 are associated with one or more charging stations. The charging stations may be located at predefined home base or reference locations in the home. The robotic devices 690 may be configured to navigate to the charging stations after completion of tasks needed to be performed for the monitoring system 600. For instance, after completion of a monitoring operation or upon instruction by the control unit 610, the robotic devices 690 may be configured to automatically fly to and land on one of the charging stations. In this regard, the robotic devices 690 may automatically maintain a fully charged battery in a state in which the robotic devices 690 are ready for use by the monitoring system 600.

The charging stations may be contact based charging stations and/or wireless charging stations. For contact based charging stations, the robotic devices 690 may have readily accessible points of contact that the robotic devices 690 are capable of positioning and mating with a corresponding contact on the charging station. For instance, a helicopter type robotic device may have an electronic contact on a portion of its landing gear that rests on and mates with an electronic pad of a charging station when the helicopter type robotic device lands on the charging station. The electronic contact on the robotic device may include a cover that opens to expose the electronic contact when the robotic device is charging and closes to cover and insulate the electronic contact when the robotic device is in operation.

For wireless charging stations, the robotic devices 690 may charge through a wireless exchange of power. In these cases, the robotic devices 690 need only locate themselves closely enough to the wireless charging stations for the wireless exchange of power to occur. In this regard, the positioning needed to land at a predefined home base or reference location in the home may be less precise than with a contact based charging station. Based on the robotic devices 690 landing at a wireless charging station, the wireless charging station outputs a wireless signal that the robotic devices 690 receive and convert to a power signal that charges a battery maintained on the robotic devices 690.

In some implementations, each of the robotic devices 690 has a corresponding and assigned charging station such that the number of robotic devices 690 equals the number of charging stations. In these implementations, the robotic devices 690 always navigate to the specific charging station assigned to that robotic device. For instance, a first robotic device may always use a first charging station and a second robotic device may always use a second charging station.

In some examples, the robotic devices 690 may share charging stations. For instance, the robotic devices 690 may use one or more community charging stations that are capable of charging multiple robotic devices 690. The community charging station may be configured to charge multiple robotic devices 690 in parallel. The community charging station may be configured to charge multiple robotic devices 690 in serial such that the multiple robotic devices 690 take turns charging and, when fully charged, return to a predefined home base or reference location in the home that is not associated with a charger. The number of community charging stations may be less than the number of robotic devices 690.

In addition, the charging stations may not be assigned to specific robotic devices 690 and may be capable of charging any of the robotic devices 690. In this regard, the robotic devices 690 may use any suitable, unoccupied charging station when not in use. For instance, when one of the robotic devices 690 has completed an operation or is in need of battery charge, the control unit 610 references a stored table of the occupancy status of each charging station and instructs the robotic device to navigate to the nearest charging station that is unoccupied.

The system 600 further includes one or more integrated security devices 680. The one or more integrated security devices may include any type of device used to provide alerts based on received sensor data. For instance, the one or more control units 610 may provide one or more alerts to the one or more integrated security input/output devices 680. In some examples, the one or more control units 610 may receive one or more sensor data from the sensors 620 and determine whether to provide an alert to the one or more integrated security input/output devices 680.

The sensors 620, the home automation controls 622, the camera 630, the thermostat 634, and the integrated security devices 680 may communicate with the controller 612 over communication links 624, 626, 628, 632, 638, and 684. The communication links 624, 626, 628, 632, 638, and 684 may be a wired or wireless data pathway configured to transmit signals from the sensors 620, the home automation controls 622, the camera 630, the thermostat 634, and the integrated security devices 680 to the controller 612. The sensors 620, the home automation controls 622, the camera 630, the thermostat 634, and the integrated security devices 680 may continuously transmit sensed values to the controller 612, periodically transmit sensed values to the controller 612, or transmit sensed values to the controller 612 in response to a change in a sensed value.

The communication links 624, 626, 628, 632, 638, and 684 may include a local network. The sensors 620, the home automation controls 622, the camera 630, the thermostat 634, and the integrated security devices 680, and the controller 612 may exchange data and commands over the local network. The local network may include 802.11 "Wi-Fi" wireless Ethernet (e.g., using low-power Wi-Fi chipsets), Z-Wave, Zigbee, Bluetooth, "Homeplug" or other "Powerline" networks that operate over AC wiring, and a Category 6 (CAT5) or Category 6 (CAT6) wired Ethernet network. The local network may be a mesh network constructed based on the devices connected to the mesh network.

The monitoring server 660 is an electronic device configured to provide monitoring services by exchanging electronic communications with the control unit 610, the one or more user devices 640 and 650, and the central alarm station server 670 over the network 605. For example, the monitoring server 660 may be configured to monitor events generated by the control unit 610. In this example, the monitoring server 660 may exchange electronic communications with the network module 614 included in the control unit 610 to receive information regarding events detected by the control unit 610. The monitoring server 660 also may receive information regarding events from the one or more user devices 640 and 650.

In some examples, the monitoring server 660 may route alert data received from the network module 614 or the one or more user devices 640 and 650 to the central alarm station server 670. For example, the monitoring server 660 may transmit the alert data to the central alarm station server 670 over the network 605.

The monitoring server 660 may store sensor and image data received from the monitoring system and perform analysis of sensor and image data received from the monitoring system. Based on the analysis, the monitoring server 660 may communicate with and control aspects of the control unit 610 or the one or more user devices 640 and 650.

The monitoring server 660 may provide various monitoring services to the system 600. For example, the monitoring server 660 may analyze the sensor, image, and other data to determine an activity pattern of a resident of the home monitored by the system 600. In some implementations, the monitoring server 660 may analyze the data for alarm conditions or may determine and perform actions at the home by issuing commands to one or more of the controls 622, possibly through the control unit 610.

The monitoring server 660 can be configured to provide information (e.g., activity patterns) related to one or more residents of the home monitored by the system 600 (e.g., a user). For example, one or more of the sensors 620, the home automation controls 622, the camera 630, the thermostat 634, and the integrated security devices 680 can collect data related to a resident including location information (e.g., if the resident is home or is not home) and provide location information to the thermostat 634.

The central alarm station server 670 is an electronic device configured to provide alarm monitoring service by exchanging communications with the control unit 610, the one or more user devices 640 and 650, and the monitoring server 660 over the network 605. For example, the central alarm station server 670 may be configured to monitor alerting events generated by the control unit 610. In this example, the central alarm station server 670 may exchange communications with the network module 614 included in the control unit 610 to receive information regarding alerting events detected by the control unit 610. The central alarm station server 670 also may receive information regarding alerting events from the one or more user devices 640 and 650 and/or the monitoring server 660.

The central alarm station server 670 is connected to multiple terminals 672 and 674. The terminals 672 and 674 may be used by operators to process alerting events. For example, the central alarm station server 670 may route alerting data to the terminals 672 and 674 to enable an operator to process the alerting data. The terminals 672 and 674 may include general-purpose computers (e.g., desktop personal computers, workstations, or laptop computers) that are configured to receive alerting data from a server in the central alarm station server 670 and render a display of information based on the alerting data. For instance, the controller 612 may control the network module 614 to transmit, to the central alarm station server 670, alerting data indicating that a sensor 620 detected motion from a motion sensor via the sensors 620. The central alarm station server 670 may receive the alerting data and route the alerting data to the terminal 672 for processing by an operator associated with the terminal 672. The terminal 672 may render a display to the operator that includes information associated with the alerting event (e.g., the lock sensor data, the motion sensor data, the contact sensor data, etc.) and the operator may handle the alerting event based on the displayed information.

In some implementations, the terminals 672 and 674 may be mobile devices or devices designed for a specific function. Although FIG. 6 illustrates two terminals for brevity, actual implementations may include more (and, perhaps, many more) terminals.

The one or more authorized user devices 640 and 650 are devices that host and display user interfaces. For instance, the user device 640 is a mobile device that hosts or runs one or more native applications (e.g., the home monitoring application 642). The user device 640 may be a cellular phone or a non-cellular locally networked device with a display. The user device 640 may include a cell phone, a smart phone, a tablet PC, a personal digital assistant ("PDA"), or any other portable device configured to communicate over a network and display information. For example, implementations may also include Blackberry-type devices (e.g., as provided by Research in Motion), electronic organizers, iPhone-type devices (e.g., as provided by Apple), iPod devices (e.g., as provided by Apple) or other portable music players, other communication devices, and handheld or portable electronic devices for gaming, communications, and/or data organization. The user device 640 may perform functions unrelated to the monitoring system, such as placing personal telephone calls, playing music, playing video, displaying pictures, browsing the Internet, maintaining an electronic calendar, etc.

The user device 640 includes a home monitoring application 652. The home monitoring application 642 refers to a software/firmware program running on the corresponding mobile device that enables the user interface and features described throughout. The user device 640 may load or install the home monitoring application 642 based on data received over a network or data received from local media. The home monitoring application 642 runs on mobile devices platforms, such as iPhone, iPod touch, Blackberry, Google Android, Windows Mobile, etc. The home monitoring application 642 enables the user device 640 to receive and process image and sensor data from the monitoring system.

The user device 640 may be a general-purpose computer (e.g., a desktop personal computer, a workstation, or a laptop computer) that is configured to communicate with the monitoring server 660 and/or the control unit 610 over the network 605. The user device 640 may be configured to display a smart home user interface 652 that is generated by the user device 640 or generated by the monitoring server 660. For example, the user device 640 may be configured to display a user interface (e.g., a web page) provided by the monitoring server 660 that enables a user to perceive images captured by the camera 630 and/or reports related to the monitoring system. Although FIG. 6 illustrates two user devices for brevity, actual implementations may include more (and, perhaps, many more) or fewer user devices.

In some implementations, the one or more user devices 640 and 650 communicate with and receive monitoring system data from the control unit 610 using the communication link 638. For instance, the one or more user devices 640 and 650 may communicate with the control unit 610 using various local wireless protocols such as Wi-Fi, Bluetooth, Z-wave, Zigbee, HomePlug (ethernet over power line), or wired protocols such as Ethernet and USB, to connect the one or more user devices 640 and 650 to local security and automation equipment. The one or more user devices 640 and 650 may connect locally to the monitoring system and its sensors and other devices. The local connection may improve the speed of status and control communications because communicating through the network 605 with a remote server (e.g., the monitoring server 660) may be significantly slower.

Although the one or more user devices 640 and 650 are shown as communicating with the control unit 610, the one or more user devices 640 and 650 may communicate directly with the sensors and other devices controlled by the control unit 610. In some implementations, the one or more user devices 640 and 650 replace the control unit 610 and perform the functions of the control unit 610 for local monitoring and long range/offsite communication.

In some implementations, the one or more user devices 640 and 650 receive monitoring system data captured by the control unit 610 through the network 605. The one or more user devices 640, 650 may receive the data from the control unit 610 through the network 605 or the monitoring server 660 may relay data received from the control unit 610 to the one or more user devices 640 and 650 through the network 605. In this regard, the monitoring server 660 may facilitate communication between the one or more user devices 640 and 650 and the monitoring system.

In some implementations, the one or more user devices 640 and 650 may be configured to switch whether the one or more user devices 640 and 650 communicate with the control unit 610 directly (e.g., through link 638) or through the monitoring server 660 (e.g., through network 605) based on a location of the one or more user devices 640 and 650. For instance, when the one or more user devices 640 and 650 are located close to the control unit 610 and in range to communicate directly with the control unit 610, the one or more user devices 640 and 650 use direct communication. When the one or more user devices 640 and 650 are located far from the control unit 610 and not in range to communicate directly with the control unit 610, the one or more user devices 640 and 650 use communication through the monitoring server 660.

Although the one or more user devices 640 and 650 are shown as being connected to the network 605, in some implementations, the one or more user devices 640 and 650 are not connected to the network 605. In these implementations, the one or more user devices 640 and 650 communicate directly with one or more of the monitoring system components and no network (e.g., Internet) connection or reliance on remote servers is needed.

In some implementations, the one or more user devices 640 and 650 are used in conjunction with only local sensors and/or local devices in a house. In these implementations, the system 600 includes the one or more user devices 640 and 650, the sensors 620, the home automation controls 622, the camera 630, and the robotic devices 690. The one or more user devices 640 and 650 receive data directly from the sensors 620, the home automation controls 622, the camera 630, and the robotic devices 690, and sends data directly to the sensors 620, the home automation controls 622, the camera 630, and the robotic devices 690. The one or more user devices 640, 650 provide the appropriate interfaces/processing to provide visual surveillance and reporting.

In some implementations, the system 600 further includes network 605 and the sensors 620, the home automation controls 622, the camera 630, the thermostat 634, and the robotic devices 690, and are configured to communicate sensor and image data to the one or more user devices 640 and 650 over network 605 (e.g., the Internet, cellular network, etc.). In yet another implementation, the sensors 620, the home automation controls 622, the camera 630, the thermostat 634, and the robotic devices 690 (or a component, such as a bridge/router) are intelligent enough to change the communication pathway from a direct local pathway when the one or more user devices 640 and 650 are in close physical proximity to the sensors 620, the home automation controls 622, the camera 630, the thermostat 634, and the robotic devices 690 to a pathway over network 605 when the one or more user devices 640 and 650 are farther from the sensors 620, the home automation controls 622, the camera 630, the thermostat 634, and the robotic devices 690.

In some examples, the system leverages GPS information from the one or more user devices 640 and 650 to determine whether the one or more user devices 640 and 650 are close enough to the sensors 620, the home automation controls 622, the camera 630, the thermostat 634, and the robotic devices 690 to use the direct local pathway or whether the one or more user devices 640 and 650 are far enough from the sensors 620, the home automation controls 622, the camera 630, the thermostat 634, and the robotic devices 690 that the pathway over network 605 is required.

In some examples, the system leverages status communications (e.g., pinging) between the one or more user devices 640 and 650 and the sensors 620, the home automation controls 622, the camera 630, the thermostat 634, and the robotic devices 690 to determine whether communication using the direct local pathway is possible. If communication using the direct local pathway is possible, the one or more user devices 640 and 650 communicate with the sensors 620, the home automation controls 622, the camera 630, the thermostat 634, and the robotic devices 690 using the direct local pathway. If communication using the direct local pathway is not possible, the one or more user devices 640 and 650 communicate with the sensors 620, the home automation controls 622, the camera 630, the thermostat 634, and the robotic devices 690 using the pathway over network 605.

In some implementations, the system 600 provides end users with access to images captured by the camera 630 to aid in decision making. The system 600 may transmit the images captured by the camera 630 over a wireless WAN network to the user devices 640 and 650. Because transmission over a wireless WAN network may be relatively expensive, the system 600 can use several techniques to reduce costs while providing access to significant levels of useful visual information (e.g., compressing data, down-sampling data, sending data only over inexpensive LAN connections, or other techniques).

In some implementations, a state of the monitoring system and other events sensed by the monitoring system may be used to enable/disable video/image recording devices (e.g., the camera 630). In these implementations, the camera 630 may be set to capture images on a periodic basis when the alarm system is armed in an "away" state, but set not to capture images when the alarm system is armed in a "home" state or disarmed. In addition, the camera 630 may be triggered to begin capturing images when the alarm system detects an event, such as an alarm event, a door-opening event for a door that leads to an area within a field of view of the camera 630, or motion in the area within the field of view of the camera 630. In some implementations, the camera 630 may capture images continuously, but the captured images may be stored or transmitted over a network when needed.

The system 600 further includes a gateway 695 in communication with the control unit 610 through a communication link 697, which similarly to as described above in regards to communication links 624, 626, 628, 632, 638, and 684, may be wired or wireless and include a local network. The gateway 695 may be an indoor gateway, the control unit 610 may be a control unit, the sensors 620 may include various end devices and other gateways, the automation controls 622 may include the door 112 and the garage door lock 116, and the monitoring server 660 may be the server 102.

The described systems, methods, and techniques may be implemented in digital electronic circuitry, computer hardware, firmware, software, or in combinations of these elements. Apparatus implementing these techniques may include appropriate input and output devices, a computer processor, and a computer program product tangibly embodied in a machine-readable storage device for execution by a programmable processor. A process implementing these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device.

Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially designed ASICs (application-specific integrated circuits).

It will be understood that various modifications may be made. For example, other useful implementations could be achieved if steps of the disclosed techniques were performed in a different order and/or if components in the disclosed systems were combined in a different manner and/or replaced or supplemented by other components. Accordingly, other implementations are within the scope of the disclosure.

What is claimed is:

1. A computer-implemented method comprising:
receiving, by a provisioning system and from a device that is accepted to connect with a first network using acceptance data that comprises a first key indicating the device is associated with the first network, a request a) to join a second network different from the first network b) that identifies the first key;
determining, by the provisioning system and using the identification of the first key in the request, whether the device that transmitted the request is associated with the first network; and
in response to determining that the device that transmitted the request is associated with the first network, transmitting, by the provisioning system and to a client device of a person associated with the first network, a notification indicating that the device has (i) disconnected from the first network and (ii) requested access to the second network different from the first network.

2. The computer-implemented method of claim 1, comprising:
receiving, by the provisioning system, a first request from the device to connect to the first network;
in response to receiving the first request, generating, by the provisioning system, the acceptance data of the device to connect with the first network, the acceptance data (a) comprising the first key indicating the device is associated with the first network and (b) encrypted with a second key, wherein the first key and second key are different; and
transmitting, by the provisioning system and to the device, the acceptance data.

3. The computer-implemented method of claim 2, comprising, prior to receiving the first request from the device to connect to the first network:
receiving, by the provisioning system, first data from the device seeking to register to the first network managed by the provisioning system;
in response to receiving the data, generating, by the provisioning system, second data to register the device as a particular role in the first network; and
transmitting, by the provisioning system, the second data to the device.

4. The computer-implemented method of claim 3, wherein transmitting the second data to the device comprises transmitting, by the provisioning system, the second data comprising a third key to the device, the second data instructing the device to encrypt subsequent communications from the device using the third key, wherein the third key is different from the second key and the first key.

5. The computer-implemented method of claim 4, wherein receiving the first request from the device to connect to the first network further comprises receiving, by the provisioning system, the first request from the device, the first request encrypted with the third key, and the first request indicating to the provisioning system that the device intends to communicate with other devices on the first network.

6. The computer-implemented method of claim 5, wherein generating the acceptance data of the device to connect with the first network further comprises:
decrypting, by the provisioning system, the first request with the third key;
extracting, by the provisioning system, contents from the decrypted first request;
comparing, by the provisioning system, the extracted contents to a stored profile associated with the device to determine whether the device is registered with the first network;
in response to determining the device is registered with the first network, generating, by the provisioning system, the acceptance data comprising the first key, wherein the acceptance data indicates to the device to encrypt subsequent communications with the first key; and
encrypting, by the provisioning system, the acceptance data using a second key.

7. The computer-implemented method of claim 6, wherein receiving the second request to join the second network from the device further comprises receiving, by the provisioning system, the second request from one or more other devices at the second network, the one or more other devices at the second network configured to: (i) receive the second request from the device seeking to connect to the second network and (ii) provide the second request to the provisioning system.

8. The computer-implemented method of claim 6, wherein determining the device that transmitted the second request is associated with the first network based on the identification of the first key associated with the second request further comprises:
determining, by the provisioning system, the second request is encrypted with the first key, the first key being associated with the first network;
determining, by the provisioning system, that a gateway device that transmitted the second request is associated with the second network;
decrypting, by the provisioning system, the second request with the first key; and
extracting, by the provisioning system, contents from the second request, wherein the extracted contents comprise a request to join the second network.

9. The computer-implemented method of claim 8, further comprising:
in response to (i) determining the second request is encrypted with the first key, (ii) determining that the gateway device that transmitted the second request is associated with the second network, and (iii) determining that the extracted contents comprise the request to join the second network, determining, by the provisioning system, that the device that transmitted the second request to the gateway device is associated with the second network; and
in response, determining, by the provisioning system, that the device that transmitted the second request to the gateway device is located outside of the first network.

10. The computer-implemented method of claim 9, further comprising:
generating, by the provisioning system, instructions to indicate to the device seeking to connect to the second network to revert to encrypt subsequent communications with the third key while located at the second network;
storing, by the provisioning system, a second notification in an account of the device that the device is encrypting the subsequent communications with the third key while located at the second network; and transmitting, by the provisioning system, the generated instructions to device at the second network.

11. The computer-implemented method of claim 1, further comprising:

in response to determining the device that transmitted the second request is associated with the first network, receiving, by the provisioning system, a third request to join the first network from the device;

determining, by the provisioning system, whether the device that transmitted the third request is associated with the first network based on an identification of a third key associated with the third request;

in response to determining that the device that transmitted the third request is associated with the first network based on the identification of the third key and determining that the device was previously connected with the second network, generating, by the provisioning system, instructions to indicate to the device seeking to connect with the first network to encrypt subsequent communications with the first key;

storing, by the provisioning system, a notification in an account of the device that the device is encrypting the subsequent communications with the first key while located at the first network; and transmitting, by the provisioning system, the generated instructions to device at the first network.

12. The computer-implemented method of claim 11, comprising, in response to generating the instructions to indicate to the device seeking to reconnect with the first network to encrypt subsequent communications with the first key, determining, by the provisioning system, the device is currently located at the first network.

13. A system comprising one or more computers and one or more storage devices on which are stored instructions that are operable, when executed by the one or more computers, to cause the one or more computers to perform operations comprising:

receiving, from a device that is accepted to connect with a first network using acceptance data that comprises a first key indicating the device is associated with the first network, a request a) to join a second network different from the first network b) that identifies the first key;

determining, using the identification of the first key in the request, whether the device that transmitted the request is associated with the first network; and in response to determining that the device that transmitted the request is associated with the first network, transmitting, to a client device of a person associated with the first network, a notification indicating that the device has (i) disconnected from the first network and (ii) requested access to the second network different from the first network.

14. The system of claim 13, the operations comprising:

receiving a first request from the device to connect to the first network;

in response to receiving the first request, generating the acceptance data of the device to connect with the first network, the acceptance data (a) comprising the first key indicating the device is associated with the first network and (b) encrypted with a second key, wherein the first key and second key are different; and transmitting, to the device, the acceptance data.

15. The system of claim 14, operations comprising, prior to receiving the first request from the device to connect to the first network:

receiving first data from the device seeking to register to the first network managed by the one or more computers;

in response to receiving the data, generating second data to register the device as a particular role in the first network; and transmitting the second data to the device.

16. The system of claim 15, wherein transmitting the second data to the device comprises transmitting the second data comprising a third key to the device, the second data instructing the device to encrypt subsequent communications from the device using the third key, wherein the third key is different from the second key and the first key.

17. The system of claim 16, wherein receiving the first request from the device to connect to the first network further comprises receiving the first request from the device, the first request encrypted with the third key, and the first request indicating to the one or more computers that the device intends to communicate with other devices on the first network.

18. The system of claim 17, wherein generating the acceptance data of the device to connect with the first network further comprises:

decrypting the first request with the third key;

extracting contents from the decrypted first request;

comparing the extracted contents to a stored profile associated with the device to determine whether the device is registered with the first network;

in response to determining the device is registered with the first network, generating the acceptance data comprising the first key, wherein the acceptance data indicates to the device to encrypt subsequent communications with the first key; and encrypting the acceptance data using a second key.

19. A non-transitory computer storage medium encoded with instructions that, when executed by one or more computers, cause the one or more computers to perform operations comprising:

receiving, from a device that is accepted to connect with a first network using acceptance data that comprises a first key indicating the device is associated with the first network, a request a) to join a second network different from the first network b) that identifies the first key;

determining, using the identification of the first key in the request, whether the device that transmitted the request is associated with the first network; and in response to determining that the device that transmitted the request is associated with the first network, transmitting, to a client device of a person associated with the first network, a notification indicating that the device has (i) disconnected from the first network and (ii) requested access to the second network different from the first network.

\* \* \* \* \*